(12) United States Patent
Gifford et al.

(10) Patent No.: US 10,775,157 B2
(45) Date of Patent: Sep. 15, 2020

(54) METHODS AND APPARATUS FOR CALIBRATION FOR A FIBER OPTIC SHAPE SENSOR

(71) Applicant: INTUITIVE SURGICAL OPERATIONS, INC., Sunnyvale, CA (US)

(72) Inventors: Dawn K. Gifford, Blacksburg, VA (US); Mark E. Froggatt, Blacksburg, VA (US); Jeffrey T. Lacroix, Blacksburg, VA (US); Eric E. Sanborn, Blacksburg, VA (US); Alexander K. Sang, Blacksburg, VA (US)

(73) Assignee: Intuitive Surgical Operations, Inc., Sunnyvale, CA (US)

(*) Notice: Subject to any disclaimer, the term of this patent is extended or adjusted under 35 U.S.C. 154(b) by 82 days.

(21) Appl. No.: 16/307,269

(22) PCT Filed: May 25, 2017

(86) PCT No.: PCT/US2017/034439
§ 371 (c)(1),
(2) Date: Dec. 5, 2018

(87) PCT Pub. No.: WO2017/213874
PCT Pub. Date: Dec. 14, 2017

(65) Prior Publication Data
US 2019/0234726 A1    Aug. 1, 2019

Related U.S. Application Data

(60) Provisional application No. 62/347,704, filed on Jun. 9, 2016.

(51) Int. Cl.
*G01N 21/00* (2006.01)
*G01B 11/16* (2006.01)
(Continued)

(52) U.S. Cl.
CPC .......... *G01B 11/161* (2013.01); *G01B 11/18* (2013.01); *G01B 11/26* (2013.01); *G01B 21/045* (2013.01);
(Continued)

(58) Field of Classification Search
CPC .......... G01M 11/3109; G01M 11/338; G01M 11/3145; G01M 11/335; G01M 11/33
(Continued)

(56) References Cited

U.S. PATENT DOCUMENTS 4,372,685 A * 2/1983 Ulrich ............... G01P 13/045
                                                356/464
7,781,724 B2    8/2010 Childers et al.
(Continued)

FOREIGN PATENT DOCUMENTS

WO    WO-2017196536 A1    11/2017

OTHER PUBLICATIONS

International Search Report and Written Opinion for Application No. PCT/US2017/034439, dated Sep. 4, 2017, 17 pages.
(Continued)

*Primary Examiner* — Md M Rahman
(74) *Attorney, Agent, or Firm* — Schwegman Lundberg & Woessner, P.A.

(57) ABSTRACT

An interferometric measurement system measures a spun optical fiber sensor that includes multiple optical cores configured in the fiber sensor. A calibration machine includes a calibration fixture having known dimensions, one or more automatically controllable actuators for wrapping the fiber sensor starting at one end of the fiber sensor onto a calibration fixture having known dimensions, and an actuator controller configured to control the one or more actuators with actuator control signals. Interferometric detection circuitry, coupled to the actuator controller and to
(Continued)

the other end of the fiber sensor, detects measured interferometric pattern data associated with each of the multiple cores when the fiber sensor is wrapped onto the calibration fixture. Data processing circuitry determines compensation parameters that compensate for variations between an optimal configuration of the multiple cores and an actual configuration of the multiple cores in the fiber sensor based on the detected measured interferometric pattern data. The compensation parameters compensate subsequently-obtained measurement interferometric pattern data for the fiber sensor.

20 Claims, 32 Drawing Sheets

(51) Int. Cl.
  *G01B 21/04*  (2006.01)
  *G01D 5/353*  (2006.01)
  *G01D 18/00*  (2006.01)
  *G01L 1/24*  (2006.01)
  *G01B 11/26*  (2006.01)

(52) U.S. Cl.
  CPC ....... *G01D 5/3538* (2013.01); *G01D 5/35309* (2013.01); *G01D 5/35387* (2013.01); *G01D 18/00* (2013.01); *G01L 1/242* (2013.01)

(58) Field of Classification Search
  USPC .......................................... 356/73.1
  See application file for complete search history.

(56) References Cited

U.S. PATENT DOCUMENTS

| | | |
|---|---|---|
| 8,531,655 B2 | 9/2013 | Klein et al. |
| 8,773,650 B2 | 7/2014 | Froggatt et al. |
| 9,228,922 B1 | 1/2016 | Doddridge |
| 2009/0137952 A1 | 5/2009 | Ramamurthy |
| 2011/0113852 A1 | 5/2011 | Prisco |
| 2012/0069347 A1* | 3/2012 | Klein ................. G01B 21/045 356/477 |
| 2013/0301031 A1 | 11/2013 | Manzke et al. |
| 2014/0211198 A1 | 7/2014 | Sumetsky |
| 2016/0146699 A1 | 5/2016 | Lally et al. |
| 2017/0322113 A1 | 11/2017 | Gifford et al. |

OTHER PUBLICATIONS

Vertut, Jean and Phillipe Coiffet, Robot Technology: Teleoperation and Robotics Evolution and Development, English translation, Prentice-Hall, Inc., Inglewood Cliffs, NJ, USA 1986, vol. 3A, 332 pages.

Extended European Search Report for Application No. EP17810710.8 dated Dec. 18, 2019, 05 pages.

* cited by examiner

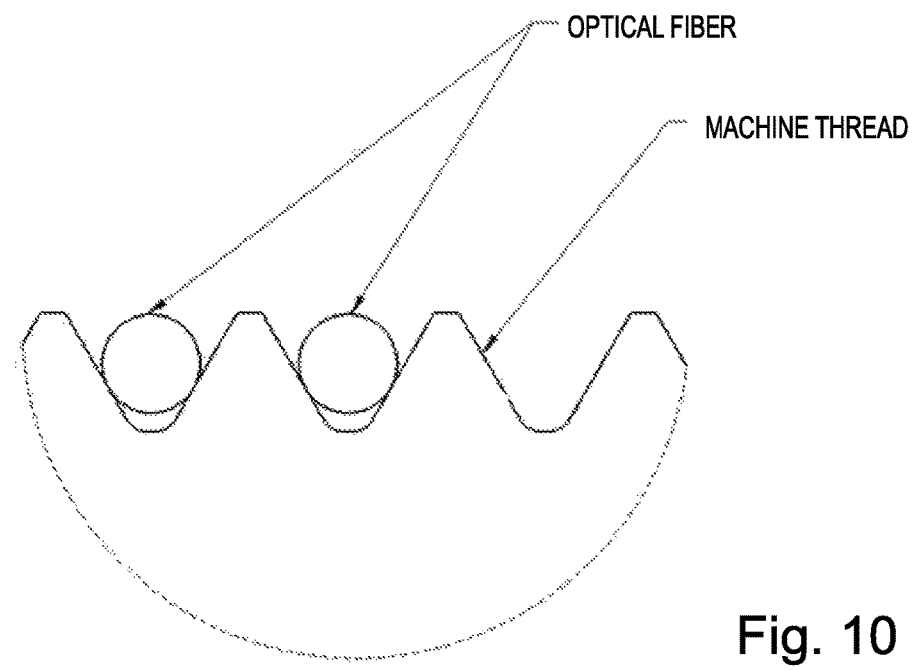
Fig. 10
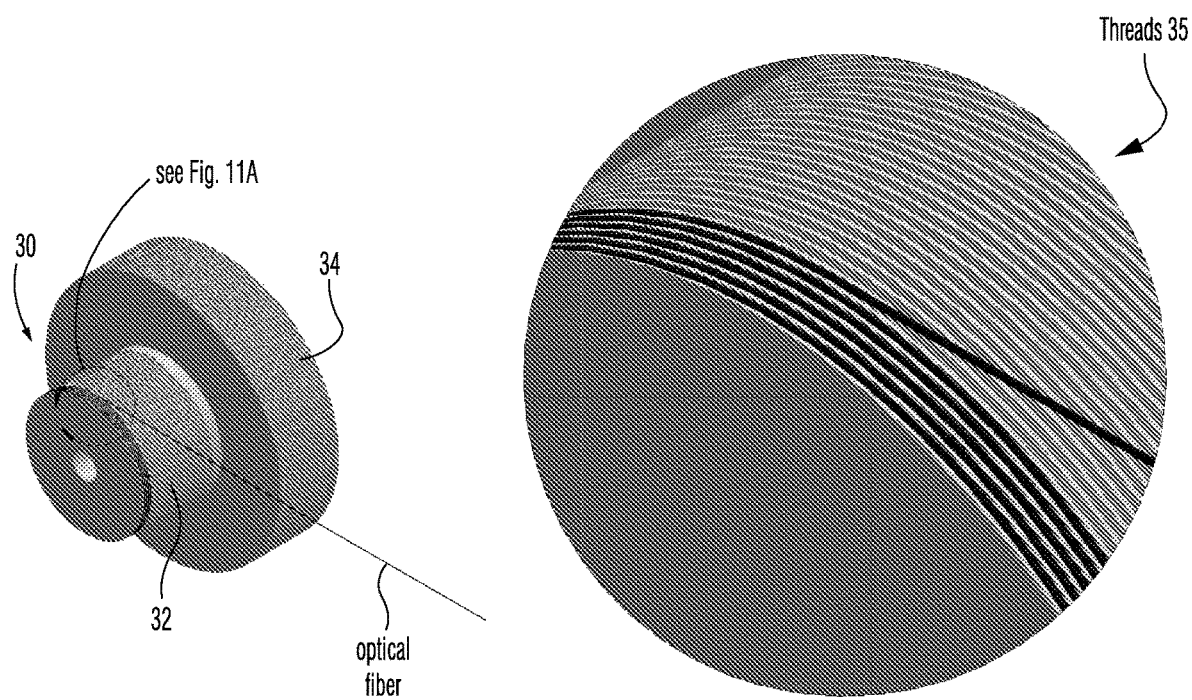
Fig. 11
Fig. 11A

Fig. 32 — Helix path of a fiber core; Fiber

METHODS AND APPARATUS FOR CALIBRATION FOR A FIBER OPTIC SHAPE SENSOR

This application is the U.S. national phase of International Application No. PCT/US2017/034439 filed May 25, 2017, which designated the U.S. and claims the priority and benefit of U.S. Provisional Patent Application 62/347,704, filed Jun. 9, 2016, entitled "METHODS AND APPARATUS FOR HELICAL CALIBRATION FOR A FIBER OPTIC SHAPE SENSOR," the entire contents of each of which are incorporated herein by reference.

TECHNICAL FIELD

The technology described in this application relates to interferometric measurements used for fiber optic shape sensing and to calibration technology to improve the accuracy and reliability of those interferometric measurements.

BACKGROUND

Optical strain sensing is a technology useful for measuring physical deformation of a waveguide caused by, for example, the change in tension, compression, or temperature of an optical fiber. A multi-core optical fiber is composed of several independent waveguides embedded within a single fiber. A continuous measure of strain along the length of a core can be derived by interpreting the optical response of the core using swept wavelength interferometry. With knowledge of the relative positions of the cores along the length of the fiber, these independent strain signals may be combined to gain a measure of the strain profile applied to the multi-core optical fiber. The strain profile of the fiber refers to the measure of applied bend strain, twist strain, and/or axial strain along the length of the fiber at a high (e.g., less than 50 micrometers) sample resolution.

Previous patents have described shape sensing with multi-core optical fibers (e.g., see U.S. Pat. Nos. 7,781,724 and 8,773,650 incorporated by reference). Some applications for shape sensing fiber require a high degree of confidence in terms of the accuracy and reliability of the shape sensing output. A non-limiting example application is robotic arms used in surgical or other environments.

In performing position and shape sensing measurements of the fiber, accuracy is limited by how well the strain signals from the independent optical cores can be recombined. Further, if accuracy levels are required that are for example on the order of 0.1% of the length of the measurement fiber, compensation for these variations is important. An ideal structure for this purpose occurs when the core waveguides are located exactly as specified by the design of the fiber after manufacture, and the physical properties of the cores are identical. But in practice, manufacturing processes are not capable of producing an ideal fiber structure. Therefore, variations, such as in core location, length, and index of refraction are observed in actual fiber structures. Unfortunately, variations from an ideal fiber structure cannot be physically measured to this desired degree of accuracy by known techniques.

In order to calculate the shape of a multi-core fiber, certain things must be known about the fiber including for example the core locations (referred to as "core geometry" and expressed as a radius and an angle), the spin rate of the fiber, and the group index of the cores. Determining these parameters through various measurement techniques is referred to as calibrating the fiber or fiber sensor. Known methods for fiber sensor calibration are described in U.S. Pat. Nos. 8,531,655 and 8,773,650, which are incorporated by reference.

One drawback with known sensor calibration techniques is that they are manual techniques which are time-intensive and expensive. Another area for improvement is that known sensor calibration techniques are not suited to a manufacturing environment because they do not account for all of the possible variations in the fiber properties that are possible in fiber manufacture. For example, previous calibration techniques did not account for variations in fiber diameter along the length of a sensor, the effect of spin rate variations on twist sensitivity, variations in the strain optic coefficients core-to-core, or variations in the thermo-optic coefficients core to core. In addition, known calibration and/or measurement techniques do not account for the effects of tension on the fiber. New calibration technology is needed to more completely calibrate a sensor and to do so in an automatable way.

SUMMARY

Example embodiments include an interferometric measurement system and method that measures a spun optical fiber sensor which includes multiple optical cores configured in the fiber sensor. A calibration machine includes a calibration fixture having known dimensions, one or more automatically controllable actuators for wrapping the fiber sensor starting at one end of the fiber sensor onto the calibration fixture having known dimensions, and an actuator controller configured to control the one or more actuators with actuator control signals. Interferometric detection circuitry, coupled to the actuator controller and to the other end of the fiber sensor, detects measured interferometric pattern data associated with each of the multiple cores when the fiber sensor is wrapped onto the calibration fixture. Data processing circuitry determines compensation parameters that compensate for variations between an optimal configuration of the multiple cores and an actual configuration of the multiple cores in the fiber sensor based on the detected measured interferometric pattern data. The compensation parameters compensate subsequently-obtained measurement interferometric pattern data for the fiber sensor.

Further example embodiments include an interferometric measurement system and method involving a spun optical fiber sensor including multiple optical cores configured in the fiber sensor. A memory stores compensation parameters determined when the fiber sensor is wrapped onto a calibration fixture having known dimensions, where the compensation parameters, when applied to measurement interferometric pattern data associated with each of the multiple optical cores when the fiber sensor is under strain, twist, and/or temperature, compensate for variations between an optimal configuration of the multiple cores in the fiber sensor and an actual configuration of multiple cores in the fiber sensor. Interferometric detection circuitry detects measurement interferometric pattern data associated with each of the multiple optical cores when the fiber sensor is under a strain. Data processing circuitry applies the compensation parameters to the detected measurement interferometric pattern data in order to distinguish between axial strain, bend strain, and twist strain on the fiber and to accurately determine one or more strain values for the fiber sensor corresponding to one or more of the axial strain, bend strain, or twist strain on the fiber sensor.

In one example application, the calibration fixture is helically-shaped.

A method, apparatus, and surgical system as described herein.

BRIEF DESCRIPTION OF THE FIGURES

FIG. 10 is a diagram of fiber wrapped on a threaded cylinder;

FIGS. 11 and 11A show an example helical fixture with two helixes of different diameters that is advantageously for calibrating an optical multi-core fiber;

DETAILED DESCRIPTION OF EXAMPLE EMBODIMENTS

Figure 1A:
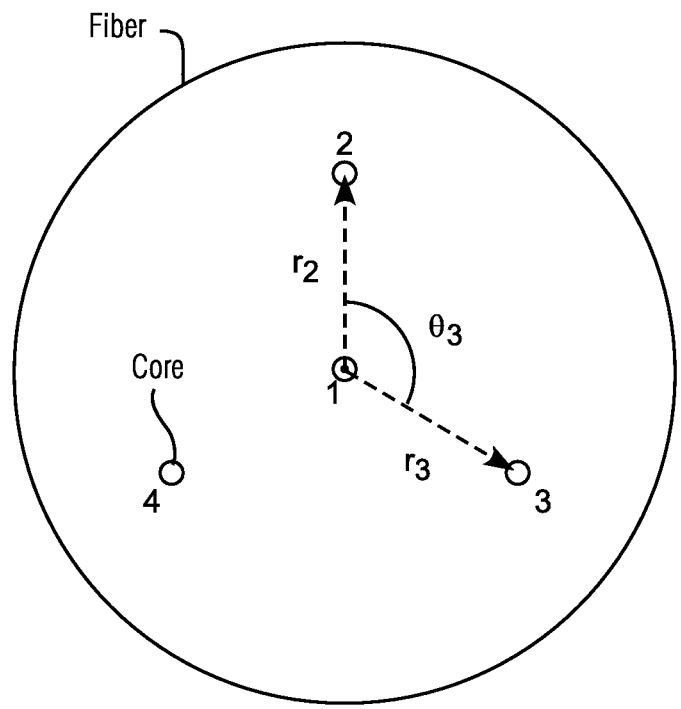
FIGS. 1A-1C are diagrams of the core geometry of example multi-core fiber designs.

The following description sets forth specific details, such as particular embodiments for purposes of explanation and not limitation. But it will be appreciated by one skilled in the art that other embodiments may be employed apart from these specific details. In some instances, detailed descriptions of well-known methods, interfaces, circuits, and devices are omitted so as not to obscure the description with unnecessary detail. Individual blocks are shown in the figures corresponding to various nodes. Those skilled in the art will appreciate that the functions of those blocks may be implemented using individual hardware circuits, using software programs and data in conjunction with a suitably programmed digital microprocessor or general purpose computer, and/or using applications specific integrated circuitry (ASIC), and/or using one or more digital signal processors (DSPs). Software program instructions and data may be stored on a non-transitory, computer-readable storage medium, and when the instructions are executed by a computer or other suitable processor control, the computer or processor performs the functions associated with those instructions.

Thus, for example, it will be appreciated by those skilled in the art that diagrams herein can represent conceptual views of illustrative circuitry or other functional units. Similarly, it will be appreciated that any flow charts, state transition diagrams, pseudocode, and the like represent various processes which may be substantially represented in computer-readable medium and so executed by a computer or processor, whether or not such computer or processor is explicitly shown.

The functions of the various illustrated elements may be provided through the use of hardware such as circuit hardware and/or hardware capable of executing software in the form of coded instructions stored on computer-readable medium. Thus, such functions and illustrated functional blocks are to be understood as being either hardware-implemented and/or computer-implemented, and thus, machine-implemented.

In terms of hardware implementation, the functional blocks may include or encompass, without limitation, a digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Figure 1B:
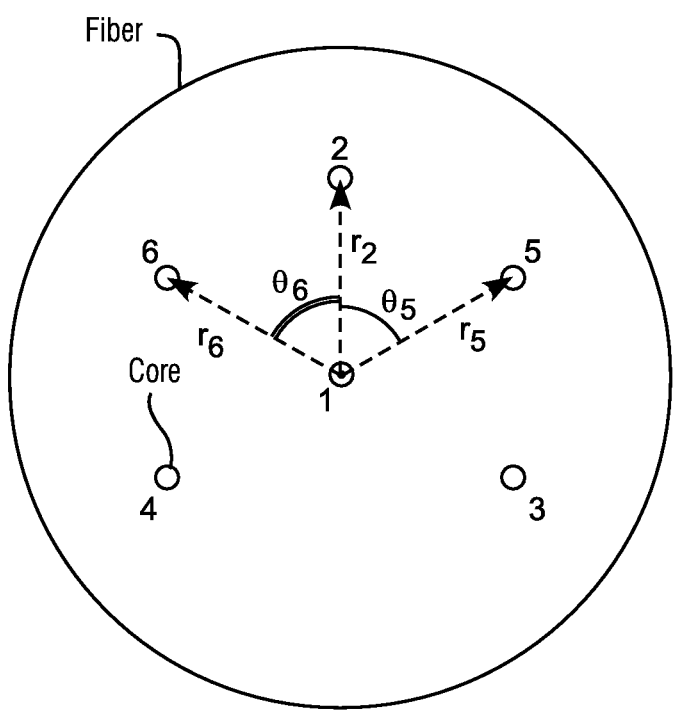
Figure 1C:
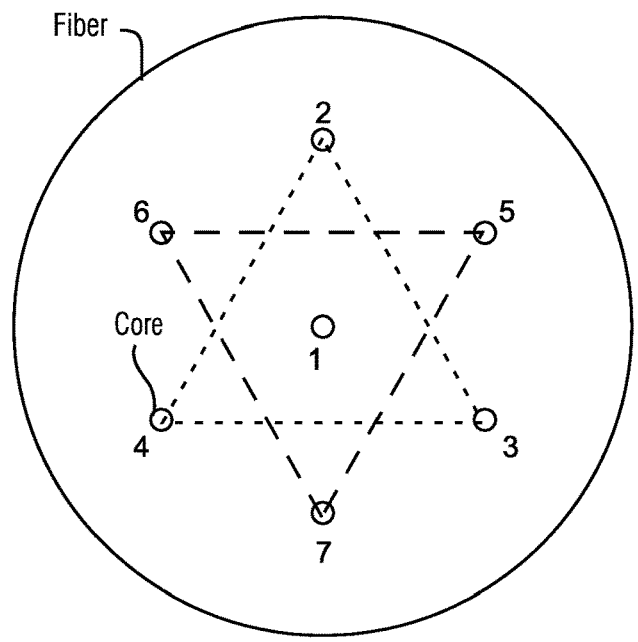

FIGS. 1A-1C shows three example embodiments of a multicore fiber for shape sensing. The example multicore fiber in FIG. 1A includes four cores with one central core 1 and three evenly-spaced outer cores 2-4. This configuration is a basic configuration for shape sensing. The example multicore fiber in FIG. 1B includes six cores with one central core and five outer cores. Here, two extra outer cores labeled 5 and 6 can be used as redundant cores to check the quality of the measured shape signal. This configuration is used in most of the example embodiments described below. Core 2 is used as the reference core for purposes of determining azimuthal angles θ from each of the other cores with respect to core 2 as shown. The center of the fiber, which may or may not correspond to the location of core 1, is used as the reference location for purposes of determining the radius parameter for each of the cores.

FIG. 1C shows a seven core fiber with one central core 1 and six outer cores 2-7. This example embodiment allows the use of either of two outer core triads (2, 3, 4) or (5, 6, 7) for shape sensing with similar results. If this fiber configuration is used, then any combination of three or more outer cores can be measured and used to calculate shape, though there is some advantage to using cores that are evenly-spaced around the fiber. The core radii from the center of the fiber (e.g., $r_2$-$r_6$) and the azimuthal angles (e.g., $\theta_2$-$\theta_6$) that describe each core location define the core geometry, and characterizing that core geometry is important for accurate shape measurement.

Figure 2:
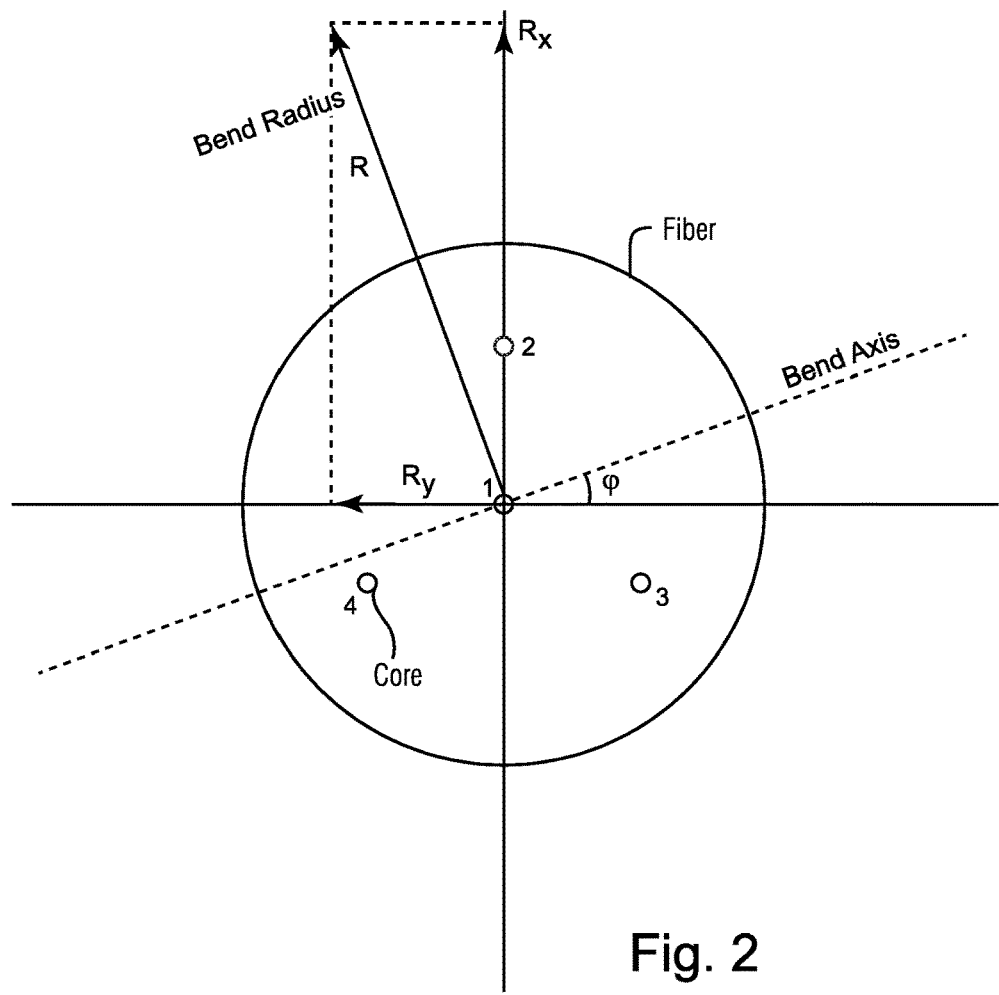
FIG. 2 is a diagram of bend axis and bend radius in an example multi-core fiber design.

When a fiber sensor made from multicore fiber is bent, each core in the fiber experiences a different magnitude of tension or compression depending on its location with respect to the axis of the bend and also the size of the bend radius. FIG. 2 is a diagram showing a bend axis and a bend radius for a multicore fiber. The bend axis describes the axis about which the sensor is bent. The bend radius is the radius of curvature of the applied bend. $R_x$ is the bend radius in the X-Z plane, where Z is along the axis of the fiber (going into and out of the page in the figure), and X and Y are arbitrarily defined orthogonal planes also orthogonal to Z. $R_y$ is the bend radius in the Y-Z plane.

Figure 3:
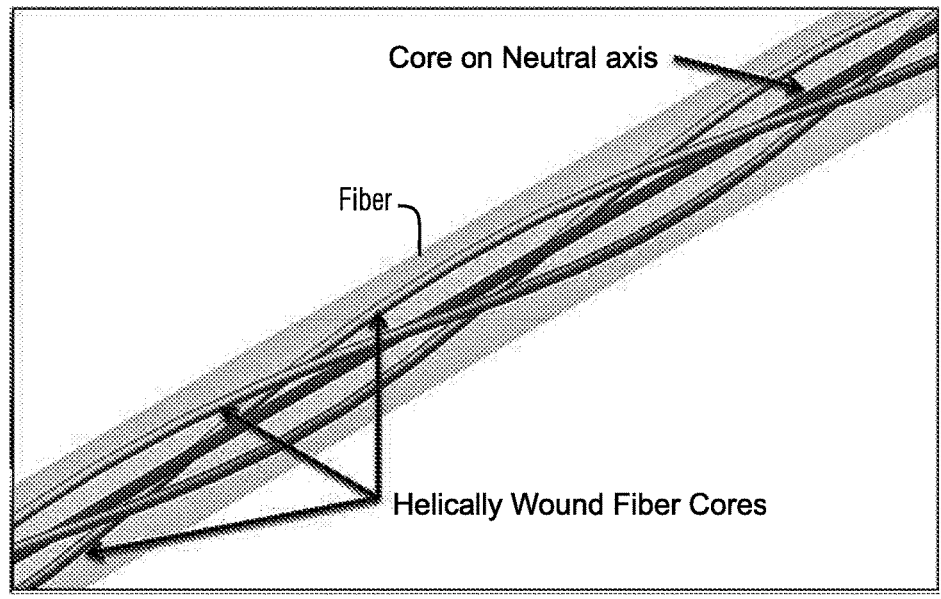
FIG. 3 shows an example diagram of spun or helically-wound multicore fiber.
Figure 4A:
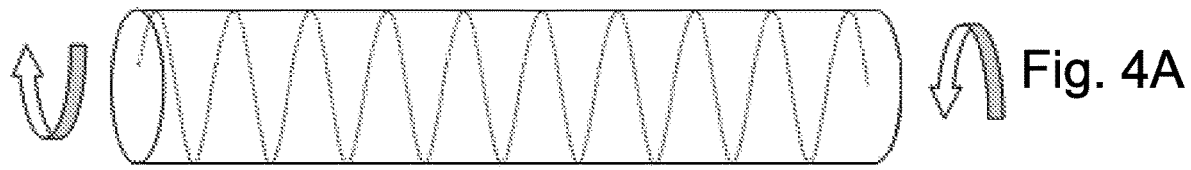
FIGS. 4A-4C are diagrams showing effects of twist in opposite directions on a length of helically-wound cores.
Figure 4B:
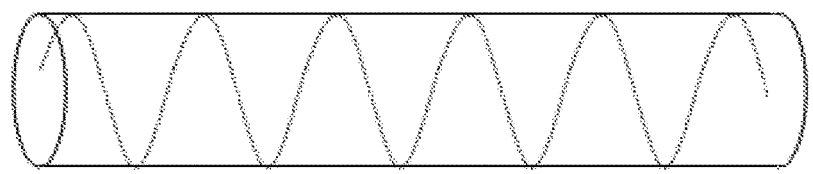
Figure 4C:
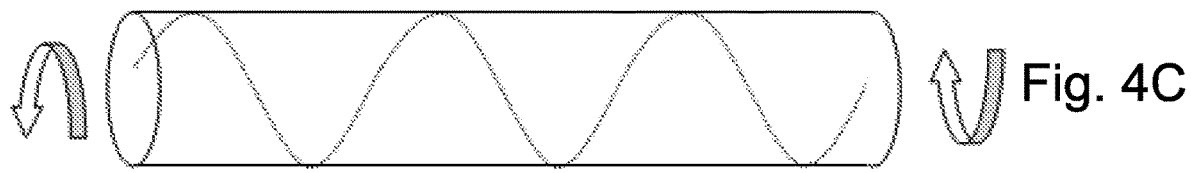

The multicore fiber is spun in order to be able to measure the twist of a fiber sensor. Spinning the fiber during manufacture creates a fiber in which the outer cores are wound in a helical pattern around the center core. FIG. 3 shows a spun or helically-wound multicore fiber. As shown in FIGS. 4A-4C, when a helically-wound multicore fiber sensor in FIG. 4A is twisted in the same direction as the intrinsic helix in FIG. 4B, the outer cores lengthen with respect to the center core. When the helically-wound multicore fiber sensor is twisted in the opposite direction in FIG. 4C, the outer cores shorten with respect to the center core. These differences in strain between the outer cores and the center core yield a measure of the twist of the helically-wound multicore fiber sensor. This internal helix in the fiber also causes the strain in the outer fiber cores to alternate between tension and compression when the fiber is bent as the core moves from the outside of the bend to the inside of the bend and back. Characterizing the spin rate, or number of twists per meter, of the intrinsic helix and also the variation of this rate as a function of distance along the sensor is important for accurate shape measurement.

When the fiber is under tension or compression, all the fiber cores experience the same amount of lengthening or shortening. Thus bend, twist, and overall tension all cause changes in the strain measured in the various fiber cores. A matrix can be formed to describe the relationship between the bend, twist, and strain on the fiber sensor and the strain on each core. For example, if four cores are used to measure shape (see, e.g., FIG. 1A or any combination of 4 cores from another configuration), the relationship between the strain in these four cores and the applied bend, twist, and strain as a function of length is:

$$\begin{bmatrix} \varepsilon_1(z) \\ \varepsilon_2(z) \\ \varepsilon_3(z) \\ \varepsilon_4(z) \end{bmatrix} = \begin{bmatrix} \alpha r_1 \sin(\theta_1) & -\alpha r_1 \cos(\theta_1) & \beta r_1^2 & 1 \\ \alpha r_2 \sin(\theta_2) & -\alpha r_2 \cos(\theta_2) & \beta r_2^2 & 1 \\ \alpha r_3 \sin(\theta_3) & -\alpha r_3 \cos(\theta_3) & \beta r_3^2 & 1 \\ \alpha r_4 \sin(\theta_4) & -\alpha r_4 \cos(\theta_4) & \beta r_4^2 & 1 \end{bmatrix} \begin{bmatrix} B_x(z) \\ B_y(z) \\ T(z) \\ E(z) \end{bmatrix} \quad (1)$$

Here $\varepsilon_i(z)$ is the strain measured in core i as a function of distance down the sensor, z, α is a constant relating strain to bend ("bend gain"), β is a constant relating strain to twist ("twist gain"), $r_i$ is the radial location of core i with respect to the center of the fiber, $\theta_i$ is the angular location of core i relative to a reference core such as core 2 in FIGS. 1A-1C, $B_x(z)$ is the bend in the X-Z plane as a function of distance down the sensor (see FIG. 2), $B_y(z)$ is the bend in the Y-Z plane as a function of distance, T(z) is the twist of the sensor as a function of distance, and E(z) is the axial strain applied to the sensor as a function of distance.

Figure 5:
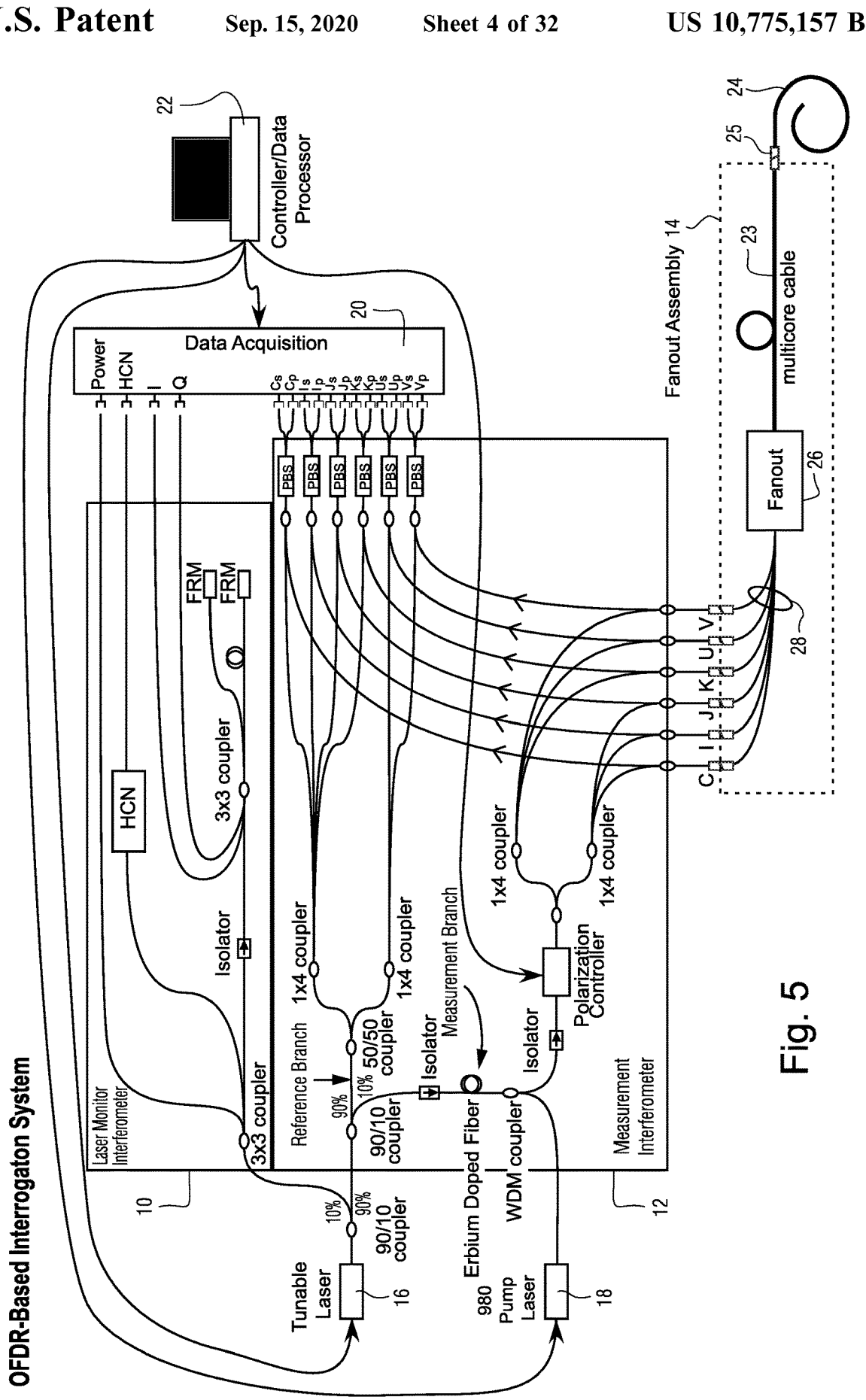
FIG. 5 is a diagram of an example OFDR interrogation system for 6 cores in a multicore fiber in this example embodiment.

A measurement of the amplitude and phase of the light reflected along the length of the fiber sensor with high resolution and high sensitivity may be achieved using Optical Frequency Domain Reflectometry (OFDR). An example OFDR interferometric interrogation system is illustrated in FIG. 5 and is used to measure and determine a phase change in each core.

Light from a frequency tunable laser 16 is split with 90/10 coupler between an OFDR interrogation system 10 (also called "laser monitor interferometer 10" where a laser is used) and a measurement interferometer 12. In the laser monitor interferometer 10, the light is spilt into three paths using a 3×3 coupler. The first path goes to a detector to monitor laser power. The second path passes through a hydrogen cyanide (HCN) gas cell to a detector to provide an absolute wavelength reference. The final path goes through an isolator and another 3×3 coupler to two Faraday rotator mirrors (FRM) with one leg having a known delay difference from the other. The return signals from this interferometer form I/Q quadrature signals used to measure the change in optical frequency as the laser sweeps.

The light going into the measurement interferometer 12 is split using a 90/10 coupler between a reference branch and measurement branch of the interferometer 12. The light in the reference branch is split into six reference signals using cascaded couplers. The light in the measurement branch passes through an isolator and then through a length of erbium-doped fiber. This fiber is pumped with light from a 980 nm pump laser 18 that couples in through a Wavelength Division Multiplexed (WDM) coupler. This combination of erbium-doped fiber and pump laser 18 amplifies the light in the measurement branch of the interferometer. The light passes through another isolator and then through a polarization controller set to flip the light between two orthogonal (or nearly orthogonal) polarization states on subsequent scans. The light is then split with cascading couplers into six measurement channels. The returning light is combined with the six reference paths using 2×2 couplers. These combined signals then pass through polarization beam splitters (PBSs) to two detectors (S and P) for each channel (C, I, J, K, U, V) input to the data acquisition circuitry 20, forming a polarization diverse detection scheme. This creates an interferometric measurement of the light reflected from up to six cores of a multicore fiber. The six channels (C, I, J, K, U, V) are connected to each core of a multicore fiber sensor 24 using a fanout assembly 14 that couples six single core fibers 28 to six cores in a multi-core cable 23 connected by a connector 25 to the multicore fiber sensor 24. A controller/data processor 22 controls the tunable laser 16, the polarization controller, and the polarization beam splitters, and also drives the pump laser 18. The data processor 22 also acquires and processes the data from each of the photodiode detectors provided from the data acquisition circuitry 20.

The recorded data is the reflected amplitude as a function of optical frequency for two polarization states, S and P, for each fiber optic core measured. The controller/data processor 22 linearizes this recorded data with respect to optical frequency using the data from the laser monitor interferometer 10 so that it is represented in equal increments of optical frequency. The linearized data is Fourier transformed into the time domain to represent the amplitude and phase of the reflected light as a function of optical delay along each fiber core. The S and P data from two sequential orthogonal polarization scans are combined to compensate for birefringence in the fiber cores and form a scalar measure of the amplitude and phase of the reflected light from each core. This combined complex signal (amplitude and phase) is compared with interferometric data recorded in a reference scan, and the resulting phase difference/change for each core is the measured signal that is used to compute the current shape of the fiber.

The derivatives of the measured phase changes are proportional to the strains in each core. The proportionality constant, $\gamma_i$, relating the phase to strain in core i is the strain-optic coefficient for that core. Equation 1 can then be expressed as:

$$\begin{bmatrix} \varphi_1'(z) \\ \varphi_2'(z) \\ \varphi_3'(z) \\ \varphi_4'(z) \end{bmatrix} = \begin{bmatrix} \alpha\gamma_1 r_1 \sin(\theta_1) & -\alpha\gamma_1 r_1 \cos(\theta_1) & \beta\gamma_1 r_1^2 & \gamma_1 \\ \alpha\gamma_2 r_2 \sin(\theta_2) & -\alpha\gamma_2 r_2 \cos(\theta_2) & \beta\gamma_2 r_2^2 & \gamma_2 \\ \alpha\gamma_3 r_3 \sin(\theta_3) & -\alpha\gamma_3 r_3 \cos(\theta_3) & \beta\gamma_3 r_3^2 & \gamma_3 \\ \alpha\gamma_4 r_4 \sin(\theta_4) & -\alpha\gamma_4 r_4 \cos(\theta_4) & \beta\gamma_4 r_4^2 & \gamma_4 \end{bmatrix} \begin{bmatrix} B_x(z) \\ B_y(z) \\ T(z) \\ E(z) \end{bmatrix} \quad (2)$$

where $\varphi_i'(z)$ is the derivative of the measured phase change for core i as a function of distance down the fiber sensor 24.

Because the position of the fiber sensor is found by first measuring the phase change in each core and then calculated by integrating the bends, $B_x(z)$ and $B_y(z)$, along the fiber while accounting for the twist, $\tau(z)$, the inverse of this equation is needed:

$$\begin{bmatrix} B_x(z) \\ B_y(z) \\ T(z) \\ E(z) \end{bmatrix} = \begin{bmatrix} \alpha\gamma_1 r_1 \sin(\theta_1) & -\alpha\gamma_1 r_1 \cos(\theta_1) & \beta\gamma_1 r_1^2 & \gamma_1 \\ \alpha\gamma_2 r_2 \sin(\theta_2) & -\alpha\gamma_2 r_2 \cos(\theta_2) & \beta\gamma_2 r_2^2 & \gamma_2 \\ \alpha\gamma_3 r_3 \sin(\theta_3) & -\alpha\gamma_3 r_3 \cos(\theta_3) & \beta\gamma_3 r_3^2 & \gamma_3 \\ \alpha\gamma_4 r_4 \sin(\theta_4) & -\alpha\gamma_4 r_4 \cos(\theta_4) & \beta\gamma_4 r_4^2 & \gamma_4 \end{bmatrix}^{-1} \begin{bmatrix} \varphi_1'(z) \\ \varphi_2'(z) \\ \varphi_3'(z) \\ \varphi_4'(z) \end{bmatrix} = \overline{\overline{S}} \begin{bmatrix} \varphi_1'(z) \\ \varphi_2'(z) \\ \varphi_3'(z) \\ \varphi_4'(z) \end{bmatrix} \quad (3)$$

Here, $\overline{\overline{S}}$ is known as the Shape Matrix.

One fundamental measurement needed for accurate shape sensing/measurement using a multicore fiber sensor 24 and an OFDR interferometric interrogation system like that in FIG. 5 is a reference measurement with the fiber in a known shape. This reference interferometric measurement data of the fiber sensor in a known state and shape is used in comparisons with subsequent measurements to compensate for the errors described above. Phase differences from the reference measurement data set are used to calculate the change in shape. One example reference shape is a straight shape. A straight fiber shape may be obtained by placing the fiber in a straight groove on a flat plate, for example, or by tensioning the fiber slightly so that it is straight and then accounting for the tension. It is desirable to take the reference interferometric measurement of the fiber with minimal twist on the fiber. This can be achieved by taking a measurement of the fiber when it is hanging vertically with one end loose and likely experiencing minimal twist. The fiber is then placed in the straight reference shape, the twist difference is calculated from the phase difference between the reference measurement and the hanging measurement, and the twist difference is minimized.

The phase change of each core versus a reference scan is measured as a function of optical delay, or the time of flight for light in each core using OFDR. In order to convert from optical delay to physical distance, the group index of each fiber core needs to be characterized. Optical delay and physical distance are related by the following equation.

$$c\tau = 2nL \quad (4)$$

Here, c is the speed of light in vacuum, $\tau$ is optical delay, n is the group index, and L is physical length, or distance along the fiber.

In an example embodiment, the group index of a reference core, for example the center core, is characterized, and then the ratio of the group indexes of the other cores determined relative to this reference core. These are referred to as relative group indexes. To avoid shape measurement inaccuracies, the relative group index of each core must be known and properly accounted for in order to properly align the data from each core with the data from the other cores.

Figure 6:
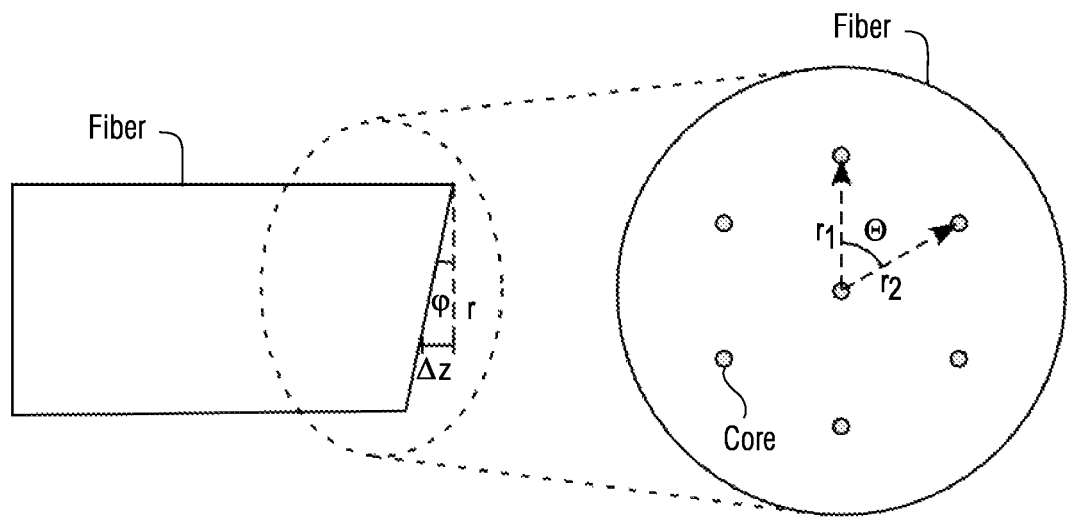
FIG. 6 is a diagram of an angle-polished fiber.

One example method to determine the relative group index of each core in a given fiber sensor is to take a measurement of the fiber sensor with the end of the fiber cleaved. Cleaving the end of the fiber gives a clear, sharp reflection peak at the same (or nearly the same depending on the quality and angle of the cleave) physical location in each core. See the example of a fiber with an angle-polished end as shown in FIG. 6. The beginning of the fiber sensor is configured with a fiber optic connector that also provides a reflection peak at the same location for each core, or, in the case of an angle-polished connector, a location with a known variation with core location in the fiber relative to the angle of the polish. Measuring time of flight between the connector reflection and the cleave reflection for each core and dividing by the time of flight for the reference core yields the relative group index for each core.

To account for an angle polish on the connector, the core geometry can be used to calculate the relative z location of each core with respect to the center core based on the angle of the cleave, $\varphi$ (see FIG. 6).

$$\Delta z_i = r_i \cos(\theta_i) \tan(\varphi) \quad (5)$$

Cross-Coupling Correction with Staggered End Reflections

Figure 7:
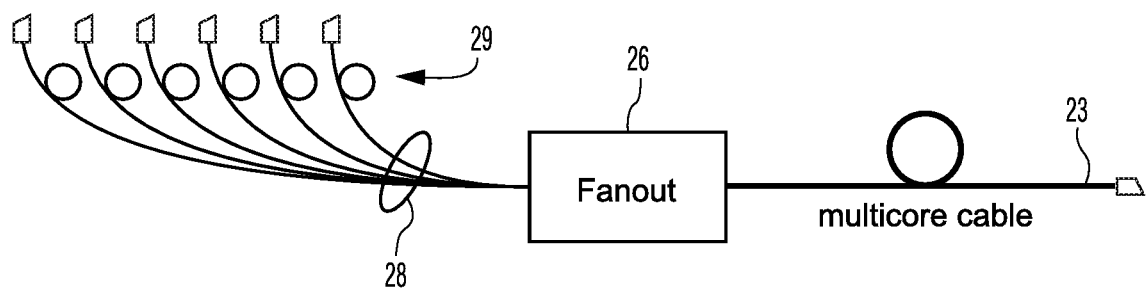
FIG. 7 illustrates a "staggered" fanout with varying delays on the leads to each fiber core.

Cross-coupling between cores can cause errors in the accuracy of this measurement. In order to avoid this cross-coupling, an interferometric measurement network like that in FIG. 5 is used with an intentionally-staggered delay that spaces out reflections associated with each core. This is accomplished in one example embodiment by using a fanout 26 with varying delays 29 in each channel such as the example shown in FIG. 7. It is also advantageous to measure the data with the fiber end cleaved with higher spatial resolution and range than used for a typical measurement scan. This is achieved by scanning the laser over a longer wavelength range, for example 40 nm instead of 20 nm and also by scanning the laser slower, for example at half the tuning speed.

The cleaved end scan can also be used to align the data from each core with the data from the other cores. Each core is measured with a different measurement path and detector in the OFDR system shown in FIG. 5. In practice, each channel has a slightly different optical delay that cause the OFDR measurement data for each core to appear at a different frequency or index in the time (delay) domain. These frequency or index shifts between cores must be measured and accounted for in order to produce optimal shape measurement accuracy. Peak finding/fitting and shifting algorithms are used to fractionally align the reflection peaks from the connector for each core. It is important to account for the difference in location due to an angle polish on the connector in this alignment. The goal is to align the data so that the measurement of strain at each location in the stored array of strains for each core corresponds to the same physical location in the fiber. The cleaved end scan is used to align the connector as it is taken with the staggered fanout and errors due to cross coupling are avoided. Once the cleaved end OFDR data is aligned using the connector reflection, this data can be used to align the reference data. Subsequent measurement data is then aligned to the reference data.

The scatter pattern from each location along any given sensor or in any core is unique. While the gratings in the cores have a periodic pattern along the length of the sensor, the Rayleigh scatter of each core along with any defects in the grating pattern, form a unique pattern that act as a fingerprint for each core in the sensor. Commonly-assigned U.S. provisional patent application 62/142,062, filed on Apr. 2, 2015, entitled "Registering measured optical fiber interferometric data with reference optical fiber interferometric data," the contents of which is incorporated by reference, uses this pattern to "register" measurement data with the reference data. This same method can be used to "register" or align the reference data with the cleaved end data. A "launch location" at the proximal end of the sensor (closer to the connector) is selected and used as a registration or alignment location. Data from this location in the reference is windowed out and compared to a search range of segments of the same size in the cleaved end data for each core. As described in U.S. provisional patent application 62/142,062, the periodic response of the gratings can be removed from the data via spectral windowing. Then an amplitude cross-correlation can be calculated between the reference segment and the currently selected cleaved end segment. This cleaved end segment is scanned along a search range within the cleaved end data and the cross-correlation amplitude is recorded as a function of cleaved end segment location. The location with the highest cross correlation amplitude is the location which matches the reference segment. This information is then used to shift the reference data so that it aligns with the cleaved end data, which has already been physically aligned. Alternatively, a "launch location" can be selected in the cleaved end data and compared with a search range of locations in the reference data. The shifted reference data is then stored in some form of file or memory location and used to compare with all subsequent measurement data.

In order to achieve optimal registration of the reference data with the cleaved end data, the strength of the reflection from the cleaved end is limited. OFDR systems have a reflection dynamic range determined by the optics and electronics used for acquisition. If the reflection from the cleaved end is too strong, it may swamp out the reflections from the Rayleigh scatter needed for the registration operation. Limiting the reflection strength can be accomplished by placing the cleaved end in some kind of index matching fluid such as glycerin. Alternatively, as only the connector peak is needed for the registration data, an additional measurement of the sensor can be taken with the cleaved end spliced to a piece of coreless optical fiber or other fiber with a form of termination that limits the strength of the end reflection.

Strain Optic Coefficients

Each fiber core can have a somewhat different material composition and thus a different optical response. One of the properties that can vary core to core is the strain-optic coefficient, $\gamma_i$, which describes the change in the propagation time in that core when the core is strained. In order to determine the strain-optic coefficient for each core, the sensor is placed in a straight shape and pulled to varying levels of tension. Comparing the change in phase with strain for each core with that of a reference core yields the relative strain-optic coefficient of each core with respect to the reference core. The absolute strain-optic coefficient for the reference core is taken up in the bend gain, $\alpha$, and the twist gain, $\beta$, which are calibrated for each sensor. A process for calibrating these gain parameters will be described below.

The strain-optic coefficient may be measured by placing the fiber in a set of tension states when it is suspended in free space. Generally, once the fiber is placed under a moderate amount of tension it is initially assumed the fiber is pulled straight. Once the fiber is straight, the slope of the relative change in phase of each core is used to determine an accurate relative strain-optic coefficient.

In practice, even when the fiber is under very high strain (e.g., 1000 micro-strain), the fiber may still change shape when subjected to further tension (e.g., 2000 micro-strain). Assuming a fiber sensor with four cores, this small change in shape is indistinguishable from a difference in the strain-optic coefficient.

However, with measurements for six outer cores, there are ten different sets of four cores that include the center core. These combinations are listed in Table 1 below. Because each set of four cores includes the center core, only the combination of outer cores are listed. As mentioned above, any set of four cores can be used to calculate shape. Using these multiple sets of strain measurements, an iterative fitting method is used to determine the phase offsets and strain coefficients that make all of the sets of four cores measure the same strain. The phase offsets are then added to the fiber sensor's calibration reference data, and the strain-optic coefficients are used in the remainder of the calibration process.

TABLE 1

Outer core combinations that can be used, with the center core, to calculate shape.

| Combination number | Core # | Core # | Core # |
|---|---|---|---|
| 1 | 2 | 3 | 4 |
| 2 | 2 | 3 | 5 |
| 3 | 2 | 3 | 6 |
| 4 | 2 | 4 | 5 |
| 5 | 2 | 4 | 6 |
| 6 | 2 | 5 | 6 |
| 7 | 3 | 4 | 5 |
| 8 | 3 | 4 | 6 |
| 9 | 3 | 5 | 6 |
| 10 | 4 | 5 | 6 |

Correcting for Slight Bends in Reference Scan

When the fiber is under tension, it can be presumed that the sensor is straight. If a straight reference shape was used, it is possible that there were some deviations from straight in the actual shape of the fiber when that data was taken. A straight, tensioned, data set can be used to identify and correct for any slight bends in a straight reference scan. In order to do this, the tension the sensor is under with respect to the reference scan needs to be accounted for, and phase changes due to bending should be corrected. These phase changes are corrected for in the phase offsets mentioned above.

Temperature Compensation with a Thermo-Optic Coefficient

Another property which can vary core-to-core is the phase change with respect to temperature changes along the length of the sensor. This is described by a thermo-optic coefficient defined in Eq. 6.

$$\varphi' \propto \frac{\Delta v}{v} = (1 - \rho_e)\varepsilon + \alpha_T \Delta T \quad (6)$$

Here $\varphi'$ is the phase change due to applied temperature and strain, $$\frac{\Delta v}{v}$$

is the change in optical frequency over the center frequency, $\rho_e$ is the strain-optic coefficient, $\varepsilon$ is the applied strain, $\alpha_T$ is the thermo-optic coefficient, and $\Delta T$ is the applied temperature change. In order to determine a relative thermo-optic coefficient in each core, data must be taken in which some kind of temperature change is applied to the sensor. For example, data can be taken with the fiber in a straight shape at various tensions, similar to those used for the straight, tensioned data sets mentioned above. However, a thermal stimulus can be applied to the sensor by, for example, placing a metal block which has been heated or cooled close to the sensor at some position along the sensor. It is helpful for this block to be some large fraction of the overall length of the sensor so that a larger phase change with temperature is affected. The change with temperature for each core can then be measured and yields the thermo-optic coefficients.

Calibration Fixture

If the sensor is manually placed in a spiral on a flat surface in order to determine the core geometry and other parameters characterizing the sensor, this process is time and labor intensive and does not lend itself to a manufacturing environment. Rather than manually placing the fiber in shapes, an automated system was developed to wind the fiber sensor into a known three dimensional shape, e.g., a helix is one non-limiting example shape. With the fiber sensor in this known shape, with a known bend (pitch and yaw), and a known twist as a function of length, the fiber sensor's parameters may be determined that ensure that the calculated shape matches the known shape. In further example embodiments, the fiber is wrapped into a plurality of shapes to aid in isolating various sensor parameters. For the helical-shape example, it can be advantageous to wrap the sensor onto different helixes with different helix diameters, and thus, different bend amplitudes.

Although helical shapes are described in example embodiments for calibration, other calibration shapes could be used as well as long as the shapes are well known in the sense that fiber's location is known at every point on the calibration shape. Calibration shapes that are readily manufactured and permit automated placement of the fiber in the shapes may be preferred but are not necessary. For example, the fiber may be wrapped (preferably automatically) in a spiral in a plane. A spiral is continuously bent, meaning there are no parts of the fiber that are straight, which is helpful for certain measurements described below, e.g., wobble measurement, bend gain measurement, etc. Other example shapes that are continuously bent include a series of S-shaped curves or a flower pattern of multiple circles. Again, the only requirement is that the shape be known to permit calibration so the calculated shape matches the expected shape.

Using Machine Threads for Calibration

Figure 8:
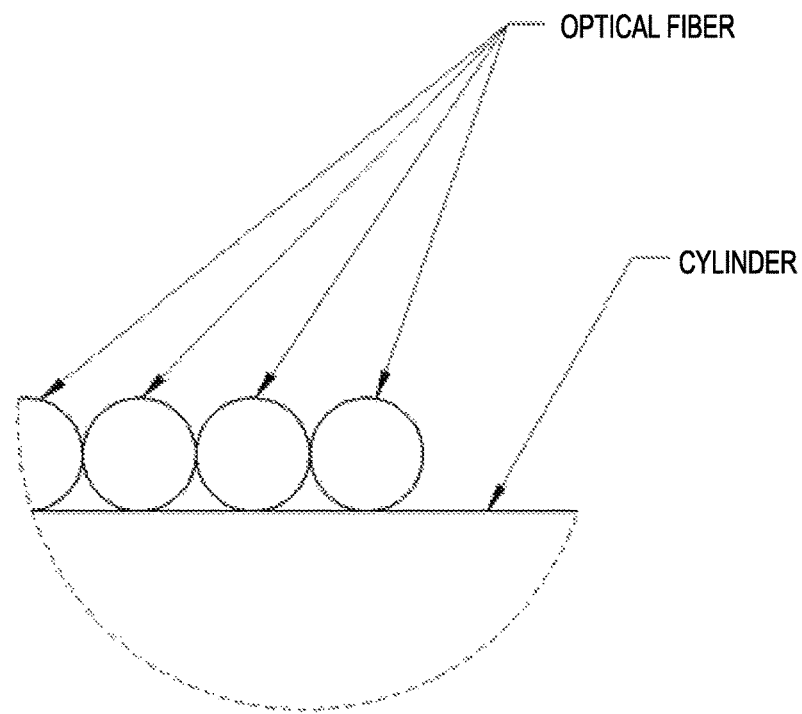
FIG. 8 is a diagram of an optical fiber wrapped on a simple cylinder.
Figure 9:
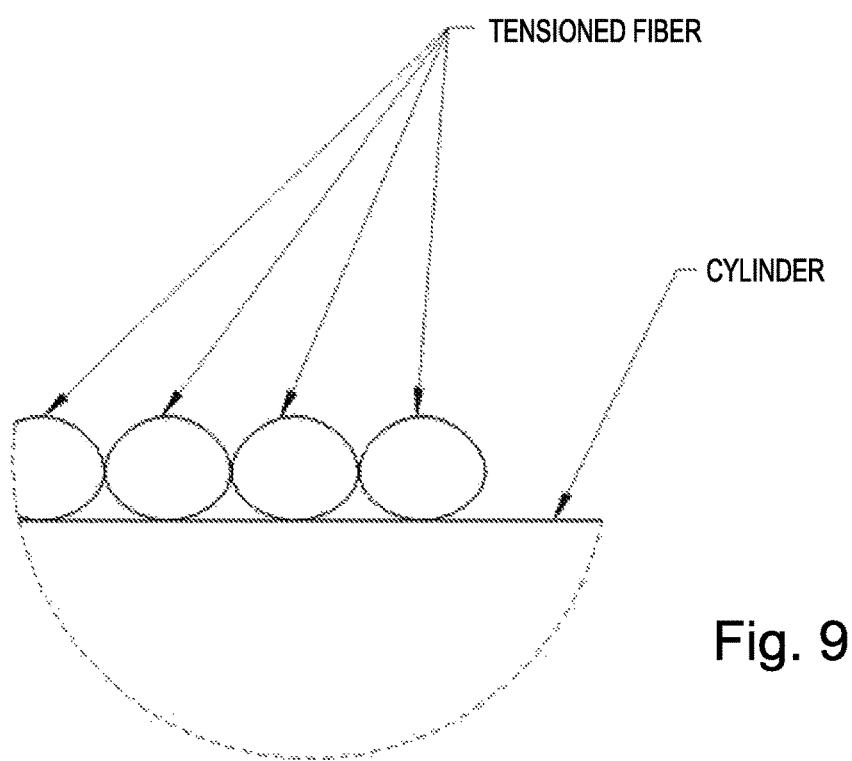
FIG. 9 is a diagram of fiber under tension wrapped on a simple cylinder.

An example fiber sensor calibration embodiment automatically wraps the fiber in a known shape. One example shown in FIG. 8 wraps the fiber directly on a cylinder with each pass of the fiber directly touching the prior wrap. Fiber is often wrapped on spools this way for storage. This approach however relies on the coating diameter being constant and near perfect wrapping of the fiber. If there is a small error in the coating diameter, then the error in location of each successive wrap increases. The pitch of the wrap helix may also be affected by the wrap tension. Given that the coating is a polymer, wrapping the fiber at tension deforms the coating, causing the radius of curvature to be reduced as well as changing the pitch of the helix as the coating bulges horizontally due to the vertical compression. This error, like a coating diameter variation, is additive and increases with each wrap. FIG. 9 shows a fiber under tension when wrapped.

FIG. 10 shows a fiber wrapped on a cylinder with V-grooves. A V-groove wrapped in a helix is a thread. By using a very fine thread, the fiber is supported on the flanks of the thread as shown in FIG. 10. The radial location of the fiber can still be affected by tension in the fiber as the coating is compressed, but it no longer has a cumulative effect on the pitch of the wrap. With a threaded calibration fixture, variations in diameter of the coating still impact the radial location of the center of the fiber, but no longer impact the pitch of the wrap.

In example embodiments, a helical fiber calibration fixture referred to generally as 30 is used in a system that automatically wraps the fiber on one or more helixes. In the example embodiment shown in FIG. 11, the helical fiber calibration fixture 30 includes two helixes 32 and 34 (also helical fixtures 32 and 34) with different diameters. In this case, each helix is a threaded cylinder of a desired diameter. FIG. 11A shows an example of helical threads 35. The two different diameter helixes 32 and 34 are stacked together to form a single helical calibration fixture 30 for winding the fiber at different diameters.

Automated System Wrapping Fiber on Helical Calibration Fixture

For a full sensor calibration, the fiber sensor is wrapped at different diameters, tensions, twists, orientations, and temperatures. These various wrappings are preferably done automatically and can be implemented in a number of ways.

Figure 12:
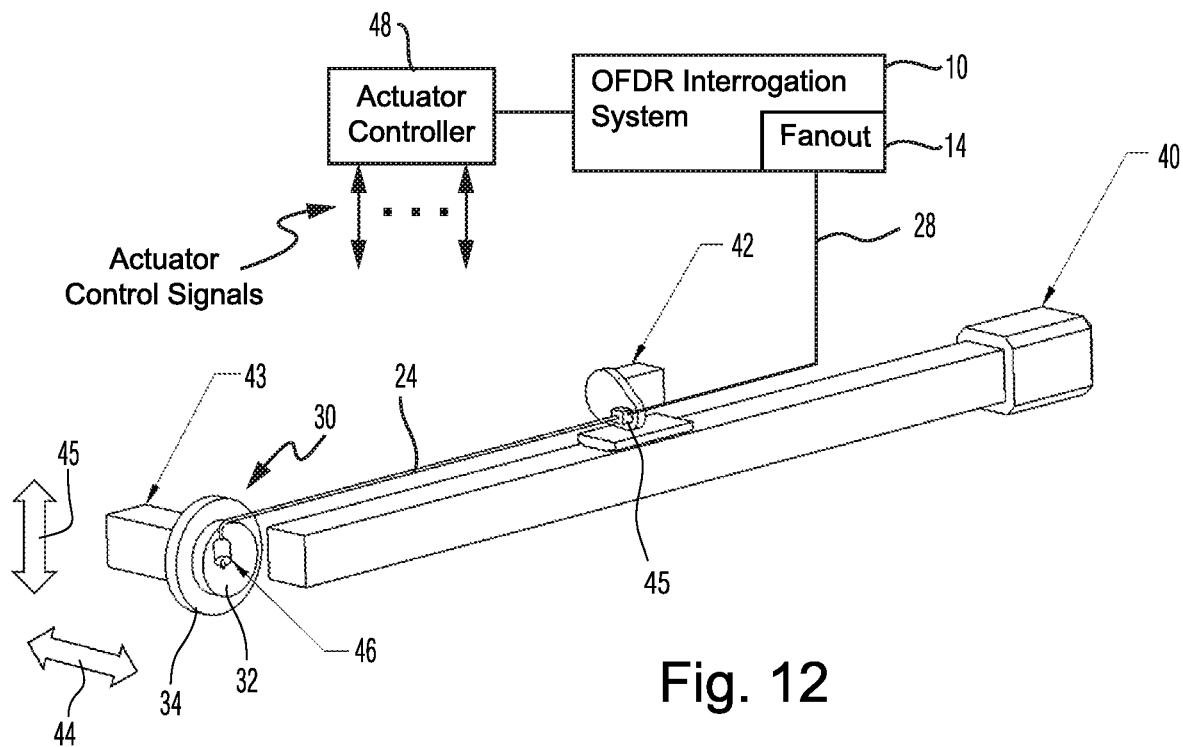
FIG. 12 illustrates an example apparatus for automatically wrapping fiber on helical fixtures of varying diameters with actuators that allow for wrapping with varying twist, rotation, and tension.

FIG. 12 illustrates an example apparatus for automatically wrapping a fiber sensor 24 on one or more threaded helical calibration fixtures 32, 34 of varying diameters with actuators that effect that wrapping with varying twist, rotation, and/or tension. Although two threaded helical fixtures 32, 34 are shown, it is understood that a single helical calibration fixture or more than two helical fixtures may be used. Motors 44 and 45 (represented as double arrows) drive respective horizontal and vertical linear actuators (not shown) that move the helical fixture to align with the connector end of the sensor depending on which helix 32, 34 is used. The connector 25 of the fiber sensor 24 is attached to a rotary actuator (a motor 42 is shown) that can rotate the fiber about the centerline or axis of the fiber. The threaded helical calibration fixture is mounted on motor 43. Motor 40 moves the connector 25 linearly along a slide of the apparatus upon which the rotary actuator (in this case, the motor 42) is movably mounted, and motor 43 rotates the threaded helical fixture 32 and 34. When moved in a synchronized fashion, motors 40 and 43 wrap the fiber sensor 24 onto the threaded helix with a constant tension. The fiber sensor 24 can be tensioned on either helix by using either motor 40 or motor 43 to apply tension prior to the wrap and then maintaining that tension during the wrapping process.

The threaded helical calibration fixture in this example embodiment has two different diameters (of helixes 32, 34). As result, the threaded helical calibration fixture is moved radially using motor 45 and laterally using motor 44 relative to the fiber sensor 24 connector when different diameter helixes are used. The movement of these two axes is less frequent and may be implemented manually or automatically using servo controlled motors as described.

Motor 46 rotates the distal end of the fiber sensor 24 which is opposite the connector end of the fiber sensor 24. Differential movement between motors 42 and 46 twists or untwists the fiber sensor 24. Combined movement of motors 42 and 46 roll the fiber sensor 24 to allow bends in other directions. Movement of motors 42 and 46 happens when the fiber is straight since friction on the helix would keep the twist from propagating through the fiber. If a wrap is desired 90° rotated from the prior wrap then the fiber is fully unwrapped and both motor 42 and motor 46 are turned 90° in the same direction and then rewrapped. If the fiber is desired to be wrapped twisted then the twist is applied with the fiber is extended straight by turning either motor 42 or motor 46 by the desired amount and then wrapping the fiber.

The motors and actuators in FIG. 12 are controlled by an actuator controller 48 which is communicatively connected to the OFDR interrogation system 10. The OFDR interrogation system 10 is shown in this example embodiment with the fanout assembly 14 integrated in the OFDR interrogation system 10. However, the fanout assembly could be configured separately from the OFDR interrogation system 10 as in the example shown in FIG. 5. The OFDR interrogation system 10 is coupled to the multi-core cable 23 via the fanout assembly 14, and the multi-core cable 23 is connected to the fiber sensor 24 via the connector 25.

Fiber Core Geometry

The location of each core with respect to the center core is determined using relative core geometry or the location of each core relative to a reference core. The relative core geometry should also account for the radial location of the reference core with a bend gain scale. An example embodiment determines the relative core geometry by automatically wrapping or winding the fiber sensor 24 on a helical calibration fixture of known pitch and diameter such as the helical calibration fixture shown in FIGS. 11, 11A, and 12 using the automated system shown in FIG. 12.

Figure 13:
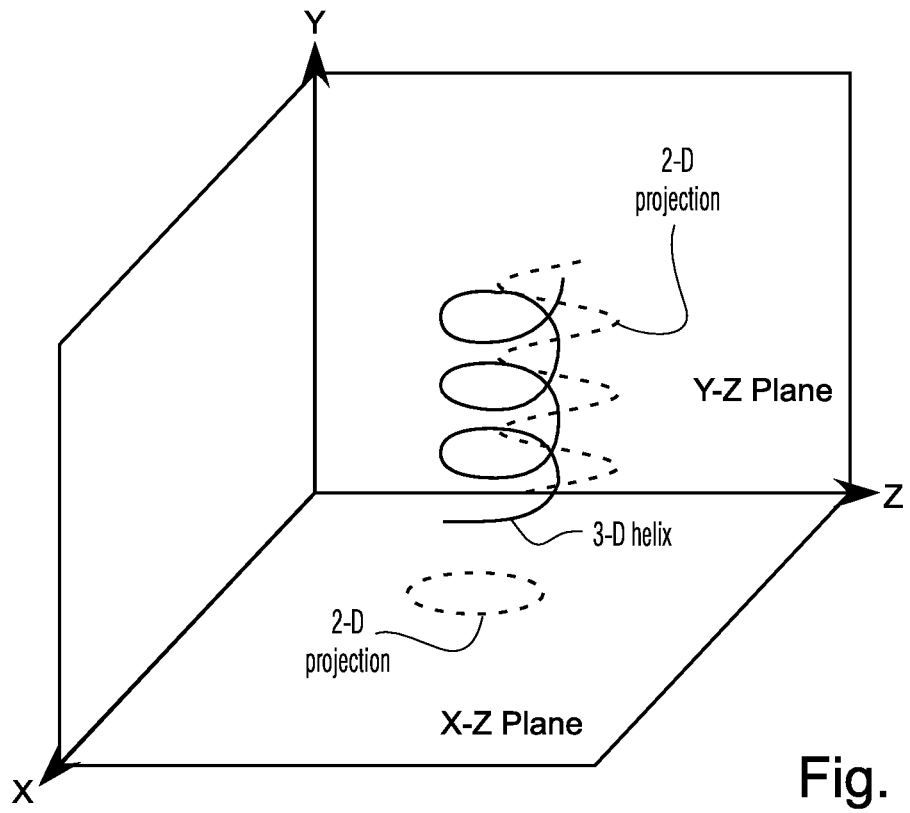
FIG. 13 is a graph of orthogonal planes and projected 2-D shapes for a 3-D helix.
Figure 14:
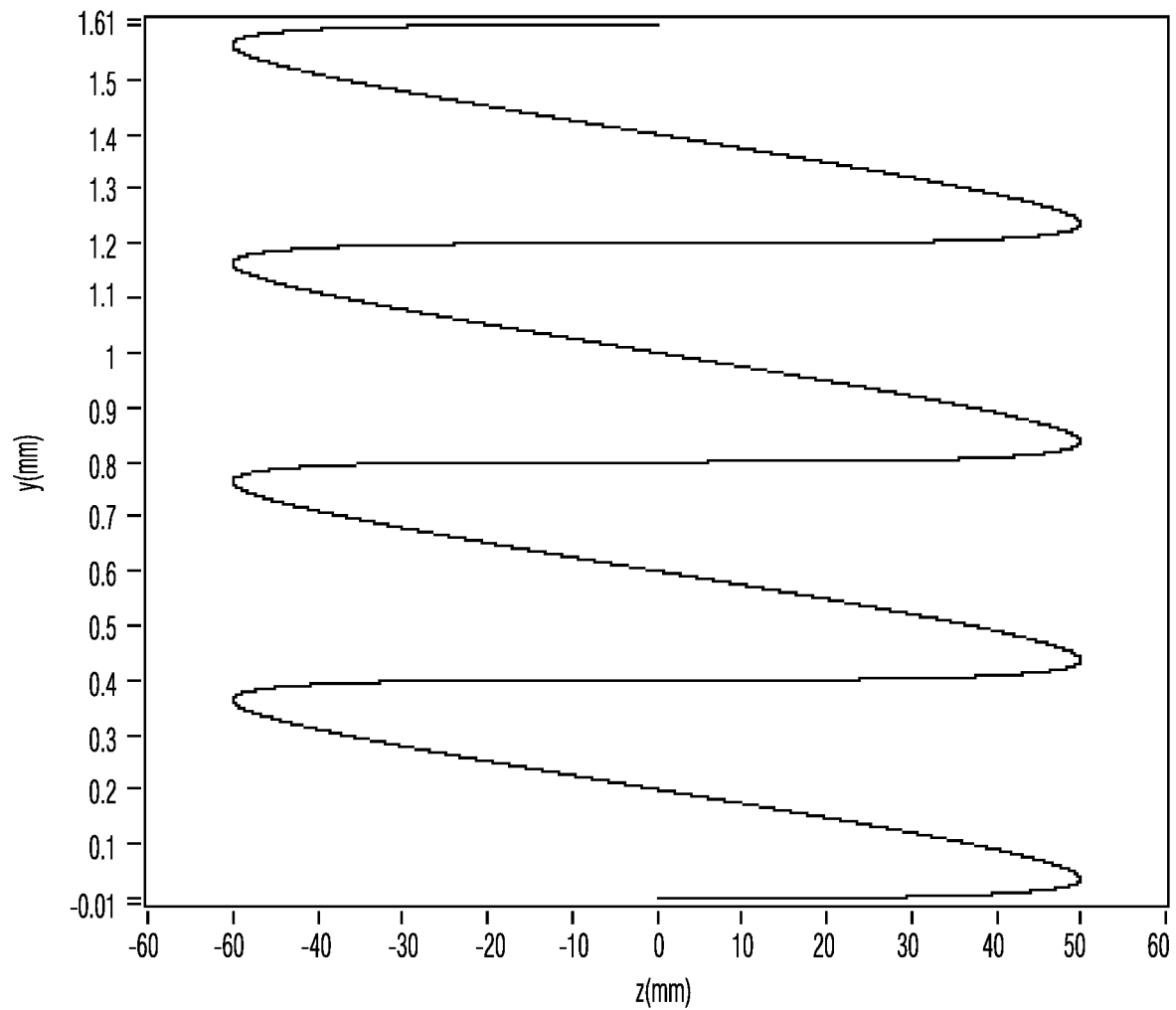
FIG. 14 is a plot of an example helical shape with a 0.4 mm pitch and 100 mm diameter in the Y-Z plane.
Figure 15:
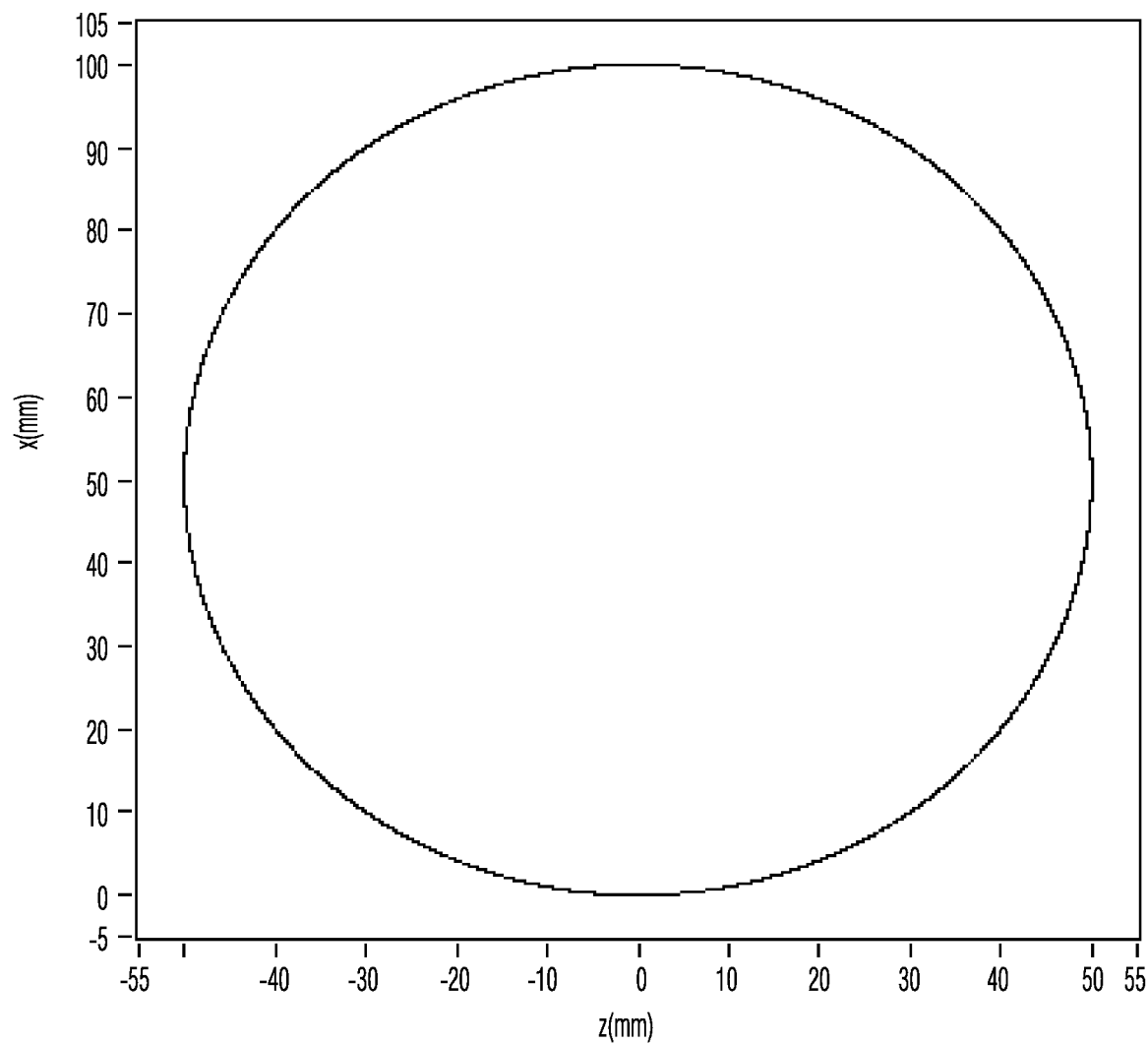
FIG. 15 is a plot of the example helical shape with a 0.4 mm pitch and 100 mm diameter in the X-Z plane.

A helical shape can be described by a particular change in bend, or pitch and yaw. Pitch and yaw are identified as $B_x$ and $B_y$, or the bend amplitude in two perpendicular planes such as the X-Z plane and Y-Z plane shown in FIG. 13. For example, a helix with a 100 mm diameter and a 0.4 mm pitch in the Y-Z plane is shown in FIG. 14. FIG. 15 shows the helix in the X-Z plane.

Figure 16:
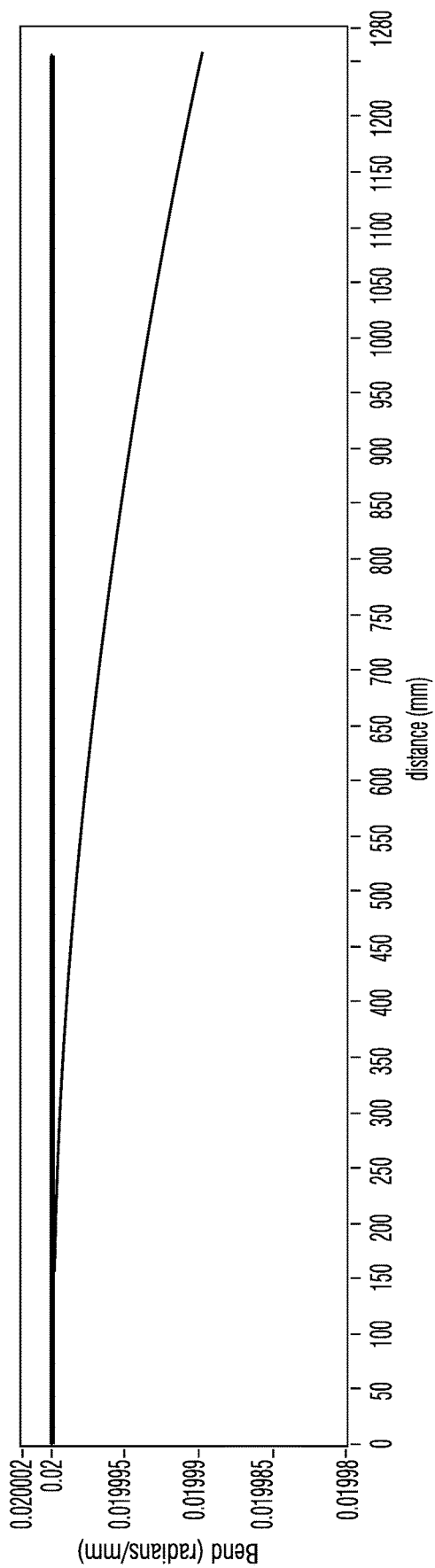
FIG. 16 plots the bend magnitude (darker line) and bend amplitude in the x-z plane (lighter line) for the helix shown in FIG. 13.
Figure 17:
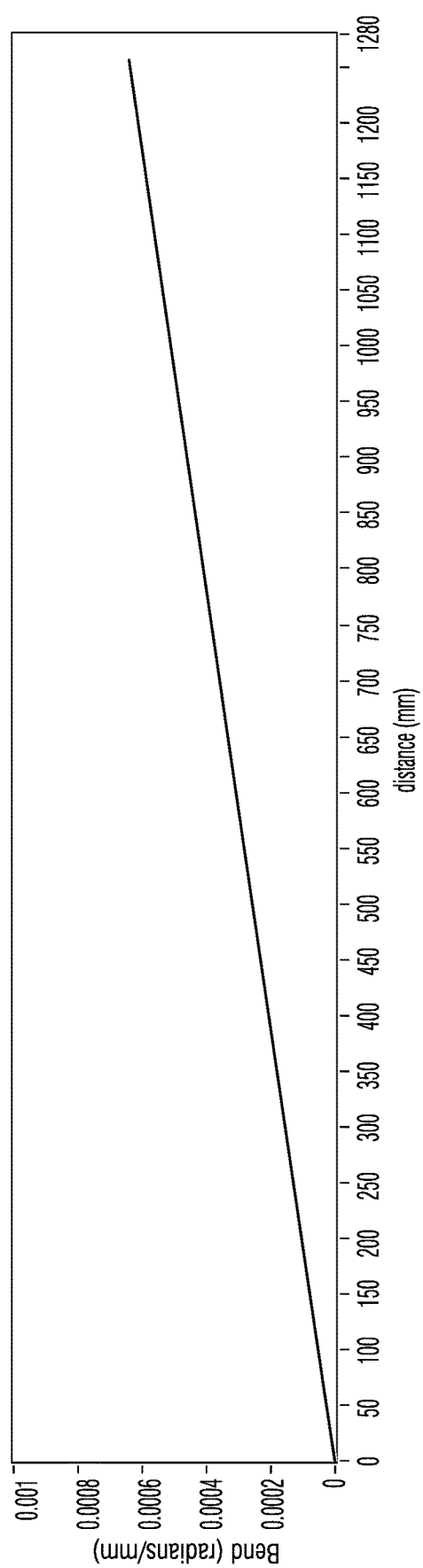
FIG. 17 plots the bend amplitude in the y-z plane for the helix shown in FIG. 13.

The corresponding bend magnitude or amplitude (darker line) and bend (lighter line) in the x-z plane as a function of distance are shown in FIG. 16. While the total bend amplitude or magnitude of the bend, $B(z)=\sqrt{B_x(z)^2+B_y(z)^2}$, remains constant, the bend in the X-Z plane, or $B_x(z)$, slowly varies. The bend in the Y-Z plane, $B_y(z)$, as a function of distance is shown in FIG. 17 slowly increasing as expected for the helical shape.

For a multi-core shape sensor that is spun such that the cores form a helix within the fiber, each core moves between the outside of the fiber with respect to the bend and the inside of fiber with respect to the bend at the rate of the fiber spin. This spin creates an oscillation in the phase change measured for each core. The oscillation period is determined by the spin rate of the fiber. The relative amplitude and phase of this oscillation for each core may be used to determine the relative geometry of the cores or the relative core locations. For example, the measured phase changes with respect to a straight reference for 6 cores in a multi-core optical fiber wrapped on a helical fixture with a 60 mm diameter are shown in FIG. 18 at A-F.

In this case, the fiber was wrapped with some tension applied, leading to the common slope in all the phases. The black trace is the center core, which is very near the neutral axis of the fiber, and thus does not experience oscillation in bend amplitude due to the fiber spin. The other cores are some radius off of center at different angular positions. The phases for these other cores show oscillations at the spin frequency. The amplitude of the oscillation depends on both the bend radius and the relative radial locations of the cores in the fiber. The relative phase of the oscillation depends on the relative angular locations of the cores in the fiber.

Figure 18:
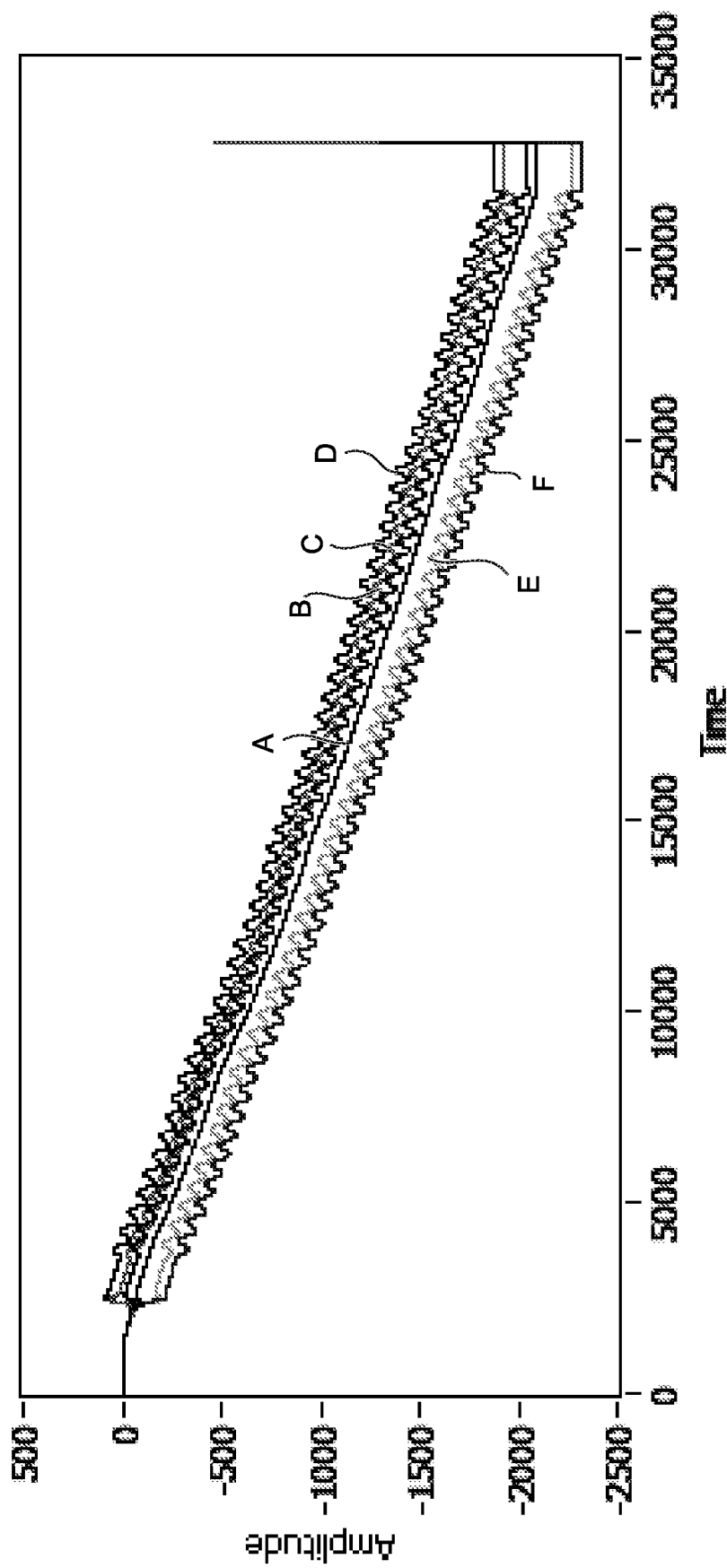
FIG. 18 plots the phase change from a straight reference state for each of 6 cores (A-F) in an example multicore fiber when the fiber is wrapped on an example 60 mm diameter helical fixture under tension.
Figure 19:
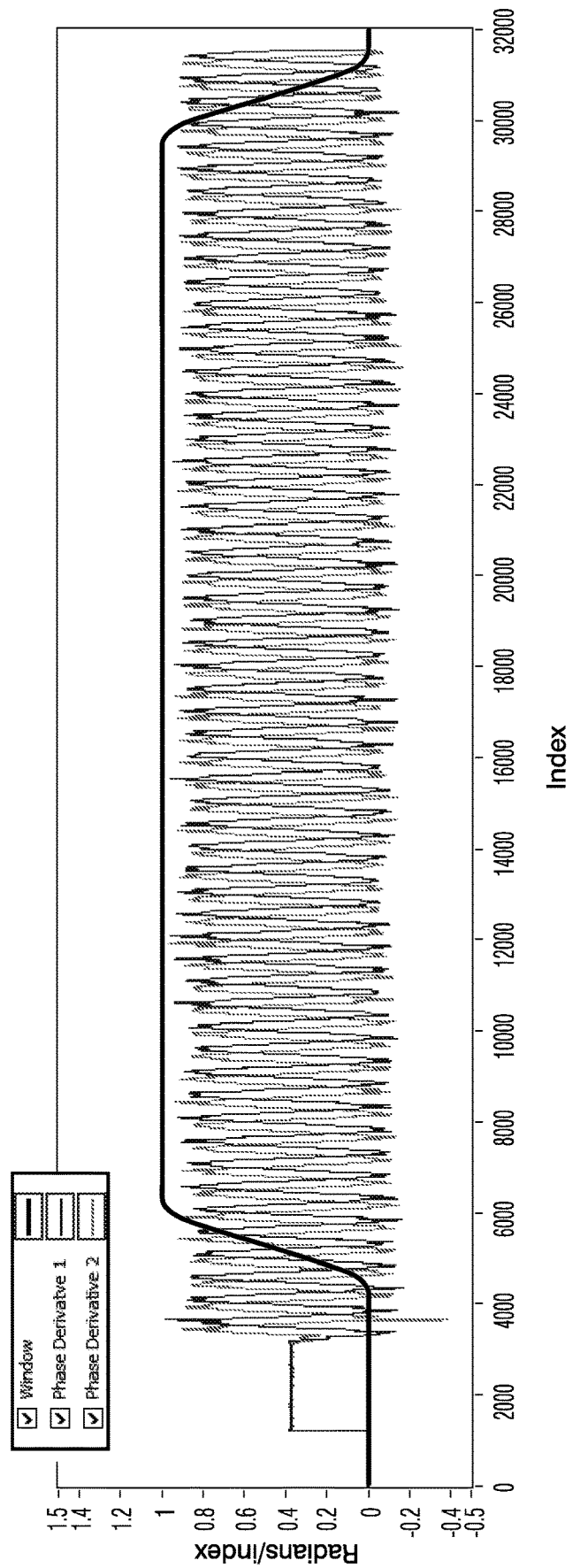
FIG. 19 plots phase derivatives for two cores in an example multicore fiber wrapped on an example helical fixture with a window used to select a section of the data where the fiber is wrapped.

The relative core geometry can be calculated from phase data like that shown in FIG. 18 by first taking a derivative of the phase data, because the phase derivative is directly proportional to the strain in the fiber. The phase derivative data for each core is then windowed around the section of data for which the sensor was wrapped on the helical calibration fixture. An example window (thick black) is shown in FIG. 19 from about index 4300 to 31500 in the data above. Phase derivative data for two example cores (for simplicity) are also shown (thin black and gray lines). Subtracting a mean or removing a slope and offset from each phase derivative data set and then Fourier transforming it into the frequency domain yields data for each core with a peak at the spin frequency. The amplitude and phase of the Fourier-transformed data for each core at the maximum of the spin frequency peak yields the radius and angle of each core. To get a relative radius and angle, the data from each core is divided by the data from a reference core. Also, to find the distributed angle and radius as a function of distance, the data for each core can be windowed around the spin frequency peak and transformed back into the time or delay domain. The relative distributed angle and radius of each signal is again calculated by comparing the data from each core to that of the reference core. One of the outer cores is typically chosen as a reference core because the amplitude of the oscillation for the center core is very small and thus the calculated phase, or angular location, for that core is relatively noisy.

It can be useful to calculate the core geometry from several different OFDR measurement scans with the fiber wrapped with some changes and average the result. For example, multiple OFDR measurement scans of the fiber may be performed with the fiber sensor wrapped on a helix with various levels of tension. Alternatively, the fiber may be wrapped around the helix after rotating the fiber's orientation different amounts with respect to the surface of the helix and an OFDR measurement scan taken for each orientation amount. The fiber sensor may also be wrapped on helixes with varying diameters. Averaging geometries calculated with multiple scans can result in a better measure of the core geometry.

Bend Gain

As explained, the geometry of each fiber core is determined with respect to a reference core. The absolute radial location of each core with respect to the center of the fiber determines the sensitivity to bend, or the magnitude of strain experienced by each core for a given bend radius. Once a relative geometry has been found, the overall strain response to bend can be set by calculating a "Bend Gain" or scale factor that maps strain amplitude to bend amplitude.

In an example embodiment, the fiber sensor is wrapped on a helical calibration fixture such that a known change in pointing direction is achieved. For example, the fiber could be wrapped exactly 3 times around the helix, or an integrated bend change of 1080 degrees. This can be achieved by using motor encoders to ensure accurate wrapping on the helical calibration fixture. One example approach is to use a differential change in bend. For example, the fiber is wrapped a small amount on the helix and a measurement is taken. Then the fiber is wrapped an additional known amount along the helix, for example, the abovementioned 1080 degrees or three wraps, and another measurement is taken.

Figure 20:
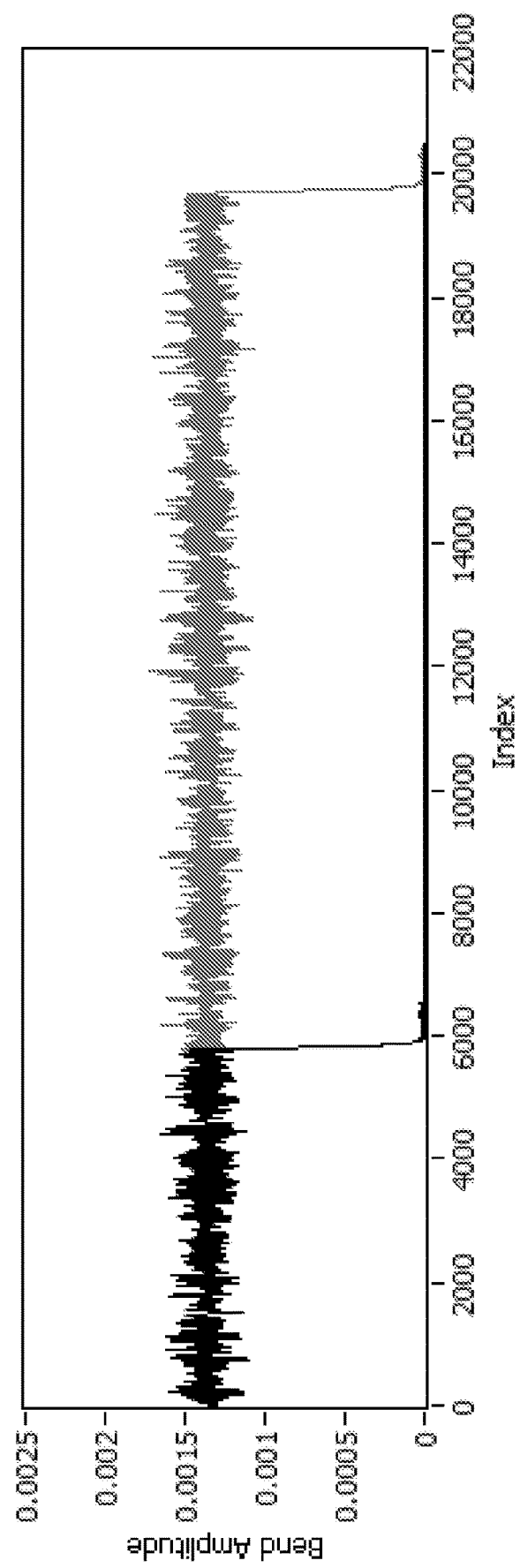
FIG. 20 is a graph showing bend amplitude for fiber wrapped some amount on a helix (darker line) and then wrapped 1080 degrees more (lighter line)

FIG. 20 shows the measured bend amplitude as a function of index in the time domain, which is proportional to distance along the fiber, for two sequential wraps on a helix, one wrapped 1080 degrees more (the lighter line) than the other (the darker line). The difference in integrated bend between these two measurements is determined and a scale is found that maps this change to 1080 degrees. It is important that the approach angle of the fiber to the helix remain constant between these two measurements or an unintentional change in pointing direction is induced, leading to an error in the calculated bend gain.

Figure 21A:
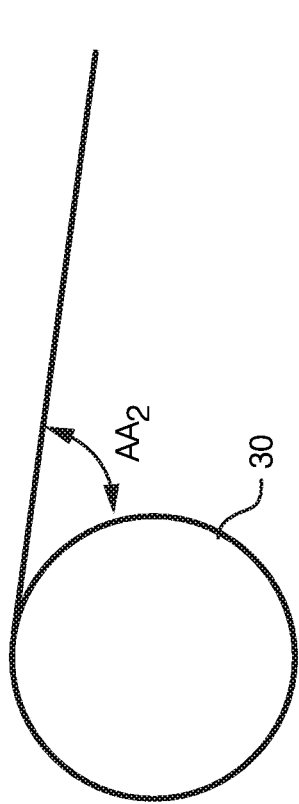
FIGS. 21A-21D show an approach angle to the helix with differing fiber end positions without (21A and 21B) and with (21C and 21D) a fixture to fix the approach angle.
Figure 21B:
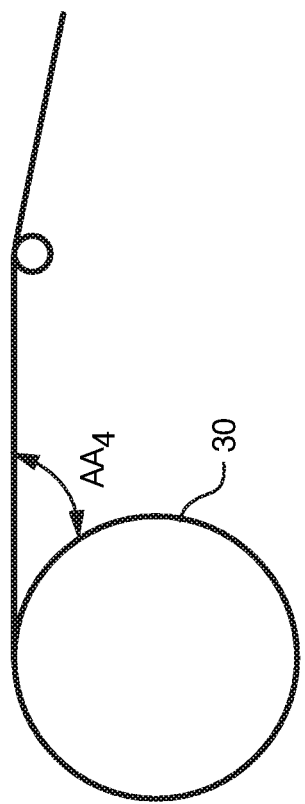
Figure 21C:
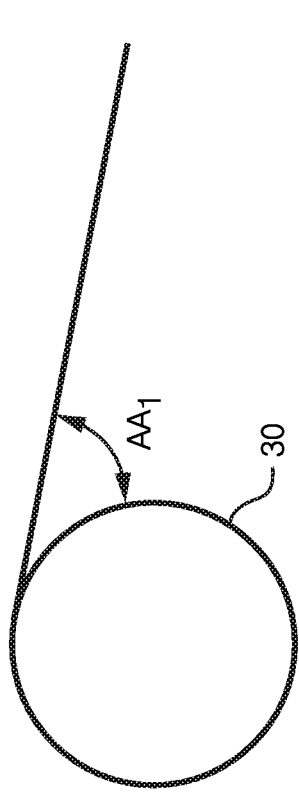
Figure 21D:
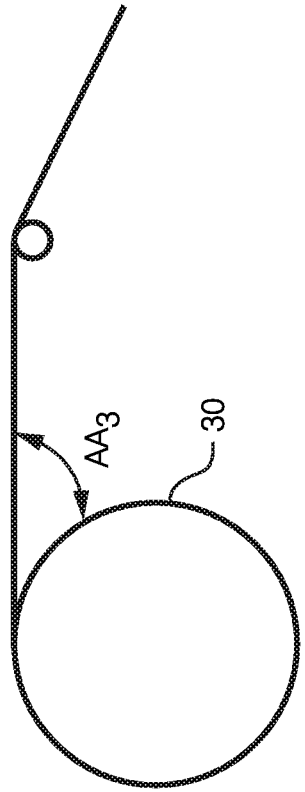

FIGS. 21A-21D show technology that controls this approach angle. In FIGS. 21A and 21B, the approach angles $AA_1$ and $AA_2$ to the helix varies when the vertical location of the connector end of the fiber is varied which introduces errors. In FIGS. 21C and 21D, a rod, pin, or other fixture is used to fix the approach angle $AA_3$ and $AA_4$ such that it does not vary as the connector location varies. This allows and compensates for less than perfect and different alignment of various parts of the automated wrapping fixture.

Group Index

The same measurements used to find the bend gain described above can also be used to determine the group index for the sensor. A method was described above for finding the relative group index of each fiber core relative to a reference core (for example the center core). The absolute group index of this reference core must be measured, however, in order to properly scale measured delay to distance along the fiber. If the fiber is placed in a helical shape with a known diameter, then the absolute group index of the reference core is determined so that the measured diameter of the calculated shape matches the known diameter of the helical shape around which the fiber sensor is wrapped. This diameter also depends on the bend gain, so it is necessary that the correct bend gain be determined as described above before calculating the group index of the reference core.

Wobble

As mentioned above, the multicore fiber is spun to create outer cores that spiral around the center core. This allows a measure of how the sensor is twisting as a function of length. The rate of this internal spin in the cores is known as the spin rate or twist rate. The sensitivity to twist depends on this rate. Ideally, this spin rate is constant along the length of the fiber. However, in practice, the rate commonly varies slightly along the length of the fiber. This is due to variations in the spin rate as the fiber is manufactured on a draw tower. These variations in spin rate, termed "wobble" must be measured and accounted for in order to produce the best shape accuracy.

The variations in spin rate, or wobble, of the fiber may be determined by wrapping the fiber sensor around a helical calibration fixture with a known pitch. As shown above, when the fiber is continuously bent along the sensor length, the phase in each fiber core has an oscillation that depends on the bend amplitude and the spin rate. Measuring the frequency of this oscillation yields the spin rate as a function of length.

$B_x(z)$ and $B_y(z)$ can be found from the phase derivatives from each core using Eq. (3). The bend angle can be expressed as $$\theta_B(z) = \tan^{-1}\left[\frac{B_y(z)}{B_x(z)}\right].$$

Figure 22:
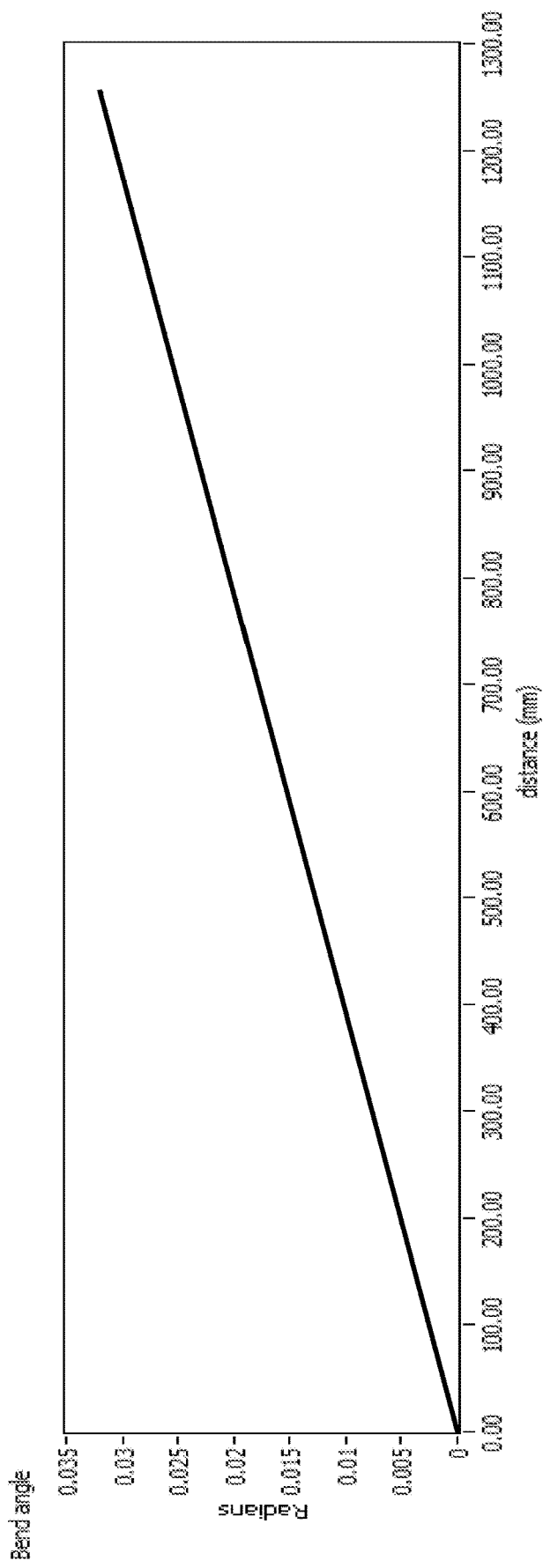
FIG. 22 graphs bend angle as a function of distance for an example helical shape with 0.4 mm pitch and 100 mm diameter.

The variation in bend angle is due to the spin rate of the fiber and the helical pitch. The bend angle change due to the helical pitch is known. For example, the bend angle as a function of distance along the fiber sensor for four helical wraps around a helical fixture with a 100 mm diameter and 0.4 mm pitch is plotted in FIG. 22. This bend angle component due to the helical fixture pitch can be removed from the calculated bend angle so that the remaining variation in bend angle is due to the spin rate of the fiber as a function of length along the fiber sensor.

One possible source of error in this spin rate measurement is deviations from the ideal helical shape, which can be caused by dust on the fiber sensor, flaws in the fiber sensor coating, or flaws in the helical fixture. If the fiber sensor is wrapped several times in a helix and rotated with respect to the helical surface, then the variations associated with the fiber rotate with the sensor. The measured spin rate is then averaged over these multiple measurements for a more accurate determination of the spin rate. In example embodiments, the fiber sensor is wrapped on helixes with different diameters or the sensor is shifted along the same helix. Averaging over several measurements in which local variations in the helical calibration fixture or dust or defects in the fiber are rotated or translated help to eliminate any bend angle variations which are not due to the intrinsic sensor helix. Alternatively, other techniques may be applied that ensure that the wobble calculated from each shape is the same and variations are excluded.

The measured spin rate of the fiber sensor is applied to fiber bend measurement to "unwrap" the bend signal, i.e., remove the oscillation due to the fiber spin from the bend measurement, leaving a measure of bend as a function of length. This "unwrapped" bend signal represents the pitch and yaw in physical space (as in FIG. 13), rather than with respect to the fiber's axes (as in FIG. 2).

Twist Gain

The spin rate of the fiber along with the radial location of the cores from the center of the fiber determines the sensitivity to fiber twist. This sensitivity must be measured and takes the form of a "Twist Gain" or twist scale factor that scales the measurement data to actual physical twist of the sensor. The twist is calculated using the shape matrix as described above in Eq (3).

The twist gain, β, may be determined by applying a twist to the fiber sensor placed in a known bent state and finding a twist gain such that the shape is calculated accurately. This is done on a helical calibration fixture by wrapping the fiber on the helix in various twist states achieved, e.g., by rotating one end of the fiber, such as the connector end, with respect to the other end before wrapping the sensor. Although exact amounts of twist need not be applied, a sufficient range of twist is preferably applied to obtain an accurate measurement of the twist scale. For example, various twist states may be applied that vary between ±360 degrees of twist. For a helical shape of known pitch, the measured helical pitch should remain constant with twist. Variations in this helical pitch with twist are due to an incorrect twist scale. Thus, a twist scale may be determined either through mathematical prediction or a search algorithm, or a combination of the two, such that the variation in helical pitch, or bend angle, with twist is minimized.

Second Order Twist

In addition to a linear scale for the twist, the inventors determined empirically that a second order twist scale is desirable to accurately account for larger twists. This second order twist scale corrects the measured twist by a factor that is proportional to that measured twist squared. This correction is expressed by the equation below.

$$T(z)' = T(z) + \zeta T(z)^2 \qquad (7)$$

In practice, the twist is filtered in some fashion to minimize the effects of noise before squaring, multiplying by the second-order twist coefficient, $\zeta$, and adding back to the original, unfiltered twist.

This second order twist coefficient can be found by winding a sensor on the helical calibration fixture with high enough twist in each direction such that this second order correction is needed (for example ±360°). The second order twist coefficient is optimized such that the bend angle slope remains the predicted bend angle slope, based on the helical shape the sensor is wound on, as the twist increases. Otherwise, the bend angle slope varies in a quadratic fashion with respect to the magnitude of the twist.

Tension to Twist

The inventors observed empirically that a false twist signal is generated when strain is applied to the fiber. Having correct strain-optic coefficients helps minimize this effect, but it is still present and should be accounted for in order to have more accurate shape measurements when there is strain applied to a sensor. This can be achieved by creating a tension to twist correction in which the measured tension is multiplied by a coefficient and added to the twist measurement. This correction can be incorporated into the shape matrix by adding the tension coefficients, multiplied by the calculated tension-to-twist constant, to the twist coefficients. Eq. (3) can be re-expressed as:

$$\begin{bmatrix} B_x(z) \\ B_y(z) \\ T(z) \\ E(z) \end{bmatrix} = \begin{bmatrix} b_{x1} & b_{x2} & b_{x3} & b_{x4} \\ b_{y1} & b_{y2} & b_{y3} & b_{y4} \\ t_1 & t_2 & t_3 & t_4 \\ e_1 & e_2 & e_3 & e_4 \end{bmatrix} \begin{bmatrix} \varphi'_1(z) \\ \varphi'_2(z) \\ \varphi'_3(z) \\ \varphi'_4(z) \end{bmatrix} = \overline{\overline{S}} \begin{bmatrix} \varphi'_1(z) \\ \varphi'_2(z) \\ \varphi'_3(z) \\ \varphi'_4(z) \end{bmatrix} \qquad (8)$$

To include tension to twist, $\overline{\overline{S}}$ is replace by a modified shape matrix, $\overline{\overline{S}}'$:

$$\overline{\overline{S}}' = \begin{bmatrix} b_{x1} & b_{x2} & b_{x3} & b_{x4} \\ b_{y1} & b_{y2} & b_{y3} & b_{y4} \\ t_1 + ke_1 & t_2 + ke_2 & t_3 + ke_3 & t_4 + ke_4 \\ e_1 & e_2 & e_3 & e_4 \end{bmatrix} \qquad (9)$$

The tension to twist coefficient can be found by wrapping the fiber sensor on the helical calibration fixture at increasing levels of tension. Then, the bend angle slope for each of these tensioned data sets is compared. The bend angle slope reflects the measured helical pitch. If there is a twist error that is linear with tension, this slope changes with tension. A tension-to-twist coefficient, k, may be determined that minimizes the variation in bend angle slope with tension.

Figure 23:
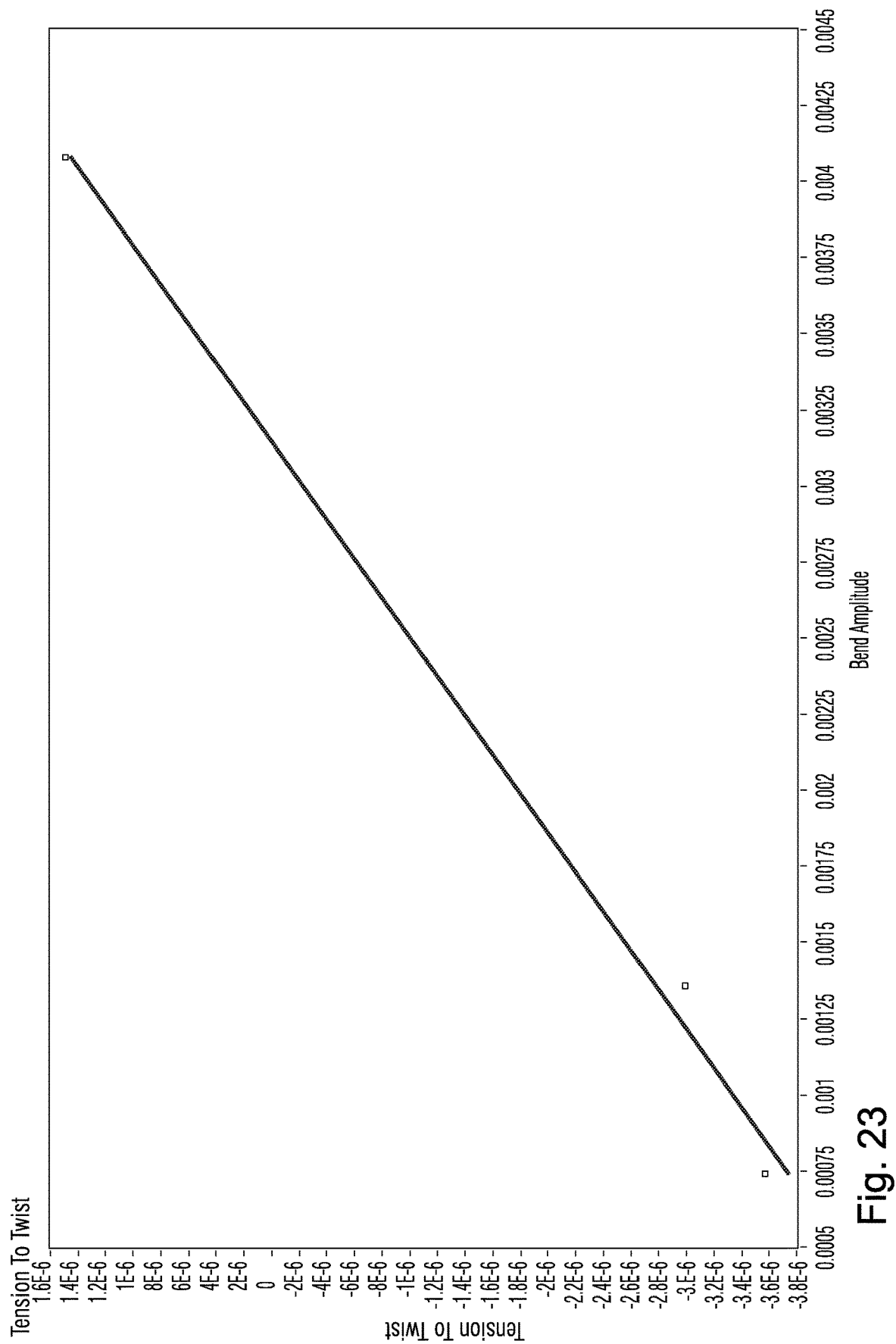
FIG. 23 graphs a tension to twist coefficient for a sensor wrapped on three helixes with varying diameters or at varying bend amplitudes.

In addition, the inventors determined empirically that the tension-to-twist coefficient that minimizes the change in bend angle slope with tension varies with bend amplitude. In other words, a different coefficient is preferable when the sensor is wrapped on helical calibration fixtures with different diameters. This effect is corrected by determining another coefficient that multiplies the bend amplitude and is then used to adjust the tension-to-twist correction. The calculated twist (calculated using the shape matrix in Eq. 9) is corrected using the following formula:

$$T(z)' = T(z) + \varsigma B(z)E(z) \qquad (10)$$

where $\varsigma$ is a calculated coefficient to account for the effect of bend amplitude on the tension-to-twist correction. This coefficient is determined by winding the fiber at increasing tension levels on helixes with varying diameters. Data sets need to be taken on helixes with at least two different diameters, but more can be used to get a better fit. The ideal k that produces the same bend angle slope for each tension level is found for the data sets at each helical diameter. k is then plotted as a function of bend amplitude, and a linear fit is performed on this data (see FIG. 23). The slope of this line is the coefficient, $\varsigma$, needed to correct for the bend amplitude dependence of the tension-to-twist correction.

Quadratic Scale Factor

A phase correction is needed to account for pressure induced strain when the fiber is tightly bent. This correction acts upon the measured phases for the outer cores and takes the following form:

$$\phi_{i,corr}(z) = \phi_i(z) - \kappa \int \left[ \frac{d\phi_i(z)}{dz} - \frac{\sum_{i=0}^{N} \frac{d\phi_i(z)}{dz}}{N} \right]^2 dz \qquad (11)$$

$\phi_i(z)$ is the measured phase difference from a reference scan for an outer core, $\phi_{i,corr}(z)$ is the corrected phase response for this core, N is the number of outer cores, and $\kappa$ is a scale factor that must be calibrated.

This scale factor $\kappa$ is determined by first wrapping the fiber sensor on a helical calibration fixture with a relatively small diameter, (e.g., 20 mm), so that pressure induced corrections are needed, and then, determining the value of $\kappa$ that makes the measured bend angle slope match the expected bend angle slope for the helical shape the fiber is wound in.

Distributed Bend and Twist

As described above, a bend gain scale is used to scale the measured strain amplitude to actual bend amplitude. This scale mostly accounts for the radial core locations with respect to the center of the fiber. While ideally the radial locations are constant as a function of length along the fiber, in practice these locations vary, requiring a distributed bend gain scale as a function of length.

Figure 24:
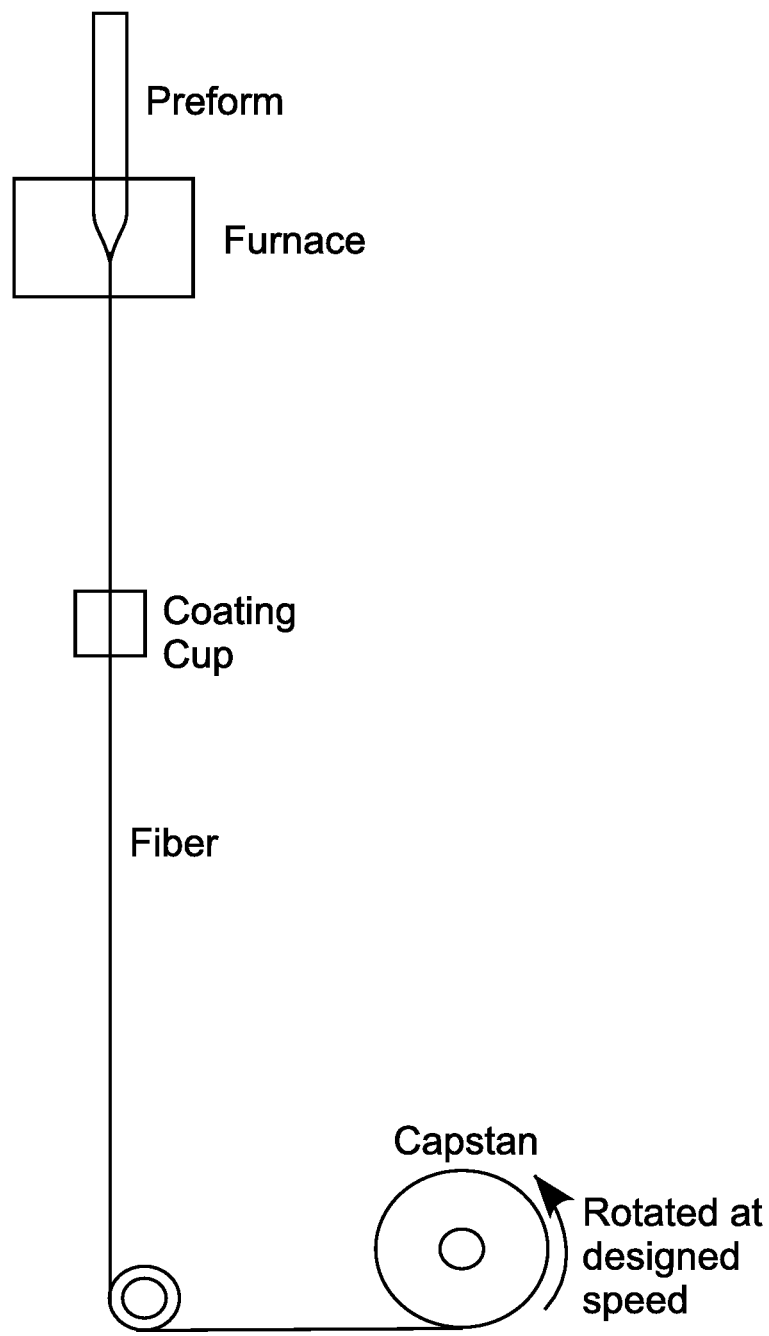
FIG. 24 is a diagram of an example fiber draw tower.
Figure 25:
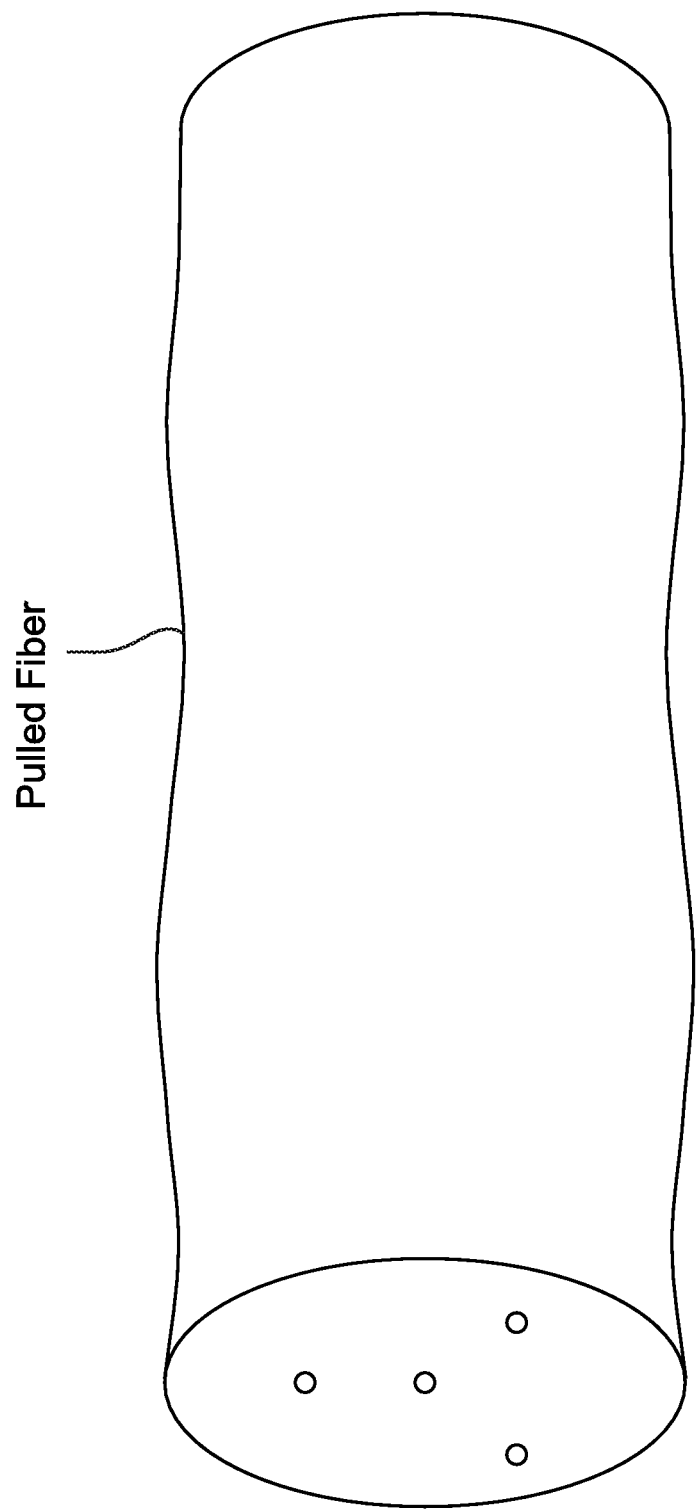
FIG. 25 shows a fiber with variations in fiber diameter with length.

The multicore fiber is drawn from a glass preform which is essentially a much larger diameter version of the end fiber after being drawn. This preform passes through a furnace to melt the glass and is pulled to a desired fiber diameter using a system that applies desired tension to the fiber and draws at a desired speed (see FIG. 24). Variations in this process could lead to changes in the diameter of the fiber as a function of length. This results in a varying radial location of the cores along the length of the fiber as shown in the example of FIG. 25. While these changes are likely small, the inventors discovered they are significant for improving shape sensing accuracy. These changes in radius are accounted for by a varying, distributed bend gain which changes as a function of length down the sensor.

In order measure the radius changes as a function of length, the fiber is placed in a known helical shape such as described earlier, i.e., the fiber is wrapped around the helical fixture in a path with a known diameter and known helical pitch. The diameter and pitch are known with a tight tolerance. When the fiber is wrapped in this helical shape around the helical calibration fixture, the measured bend amplitude, B (z), along the length of the fiber sensor should be constant because the bend diameter remains constant. Variations in this bend amplitude, then, are due to the change in radius described above. Another possibility is a change in strain-optic coefficient, but this is less likely over the lengths on the order of 1-2 m, which correlates to a small length of preform on the order of a few microns.

Figure 26:
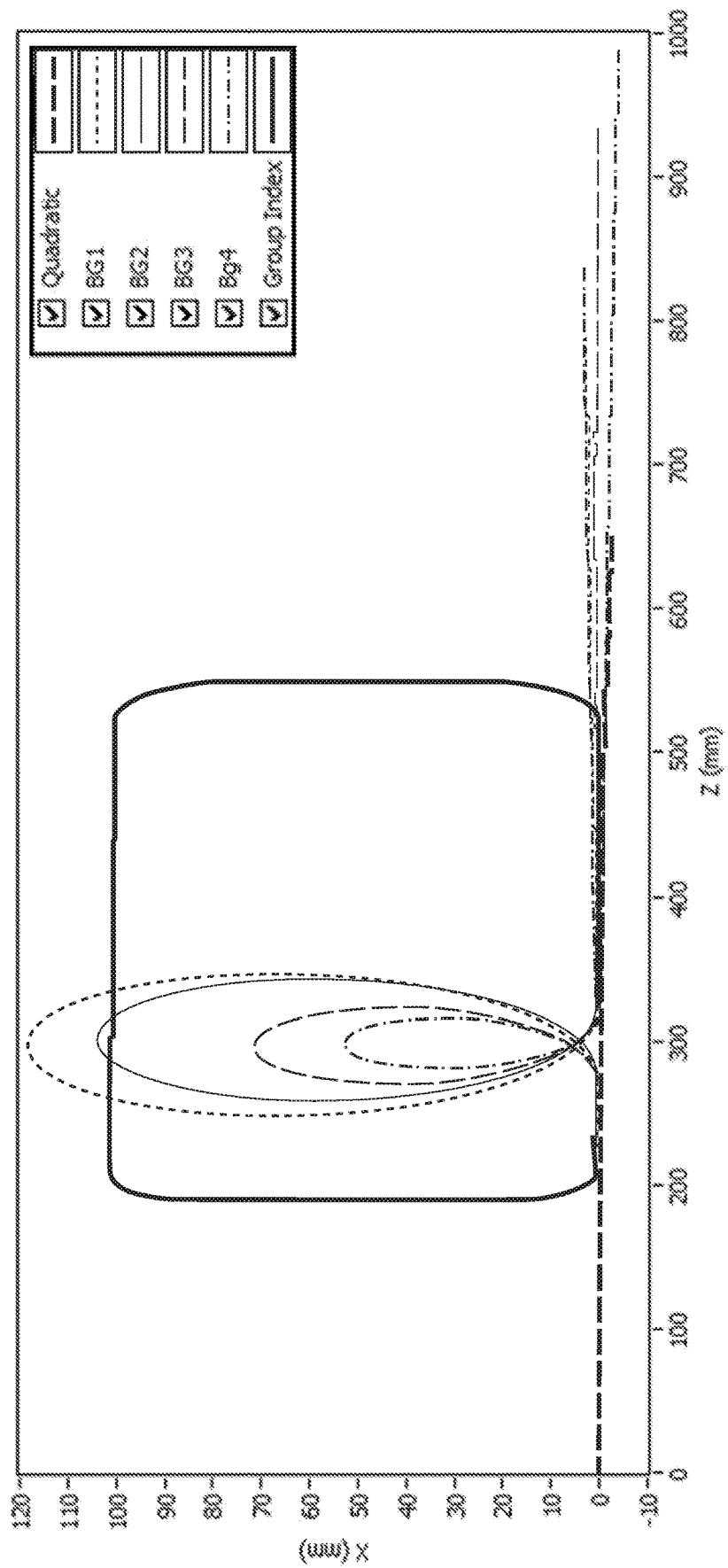
FIG. 26 is a graph of the x-z shape for an example fiber sensor placed in various shapes all entering and exiting on the same straight line.
Figure 27:
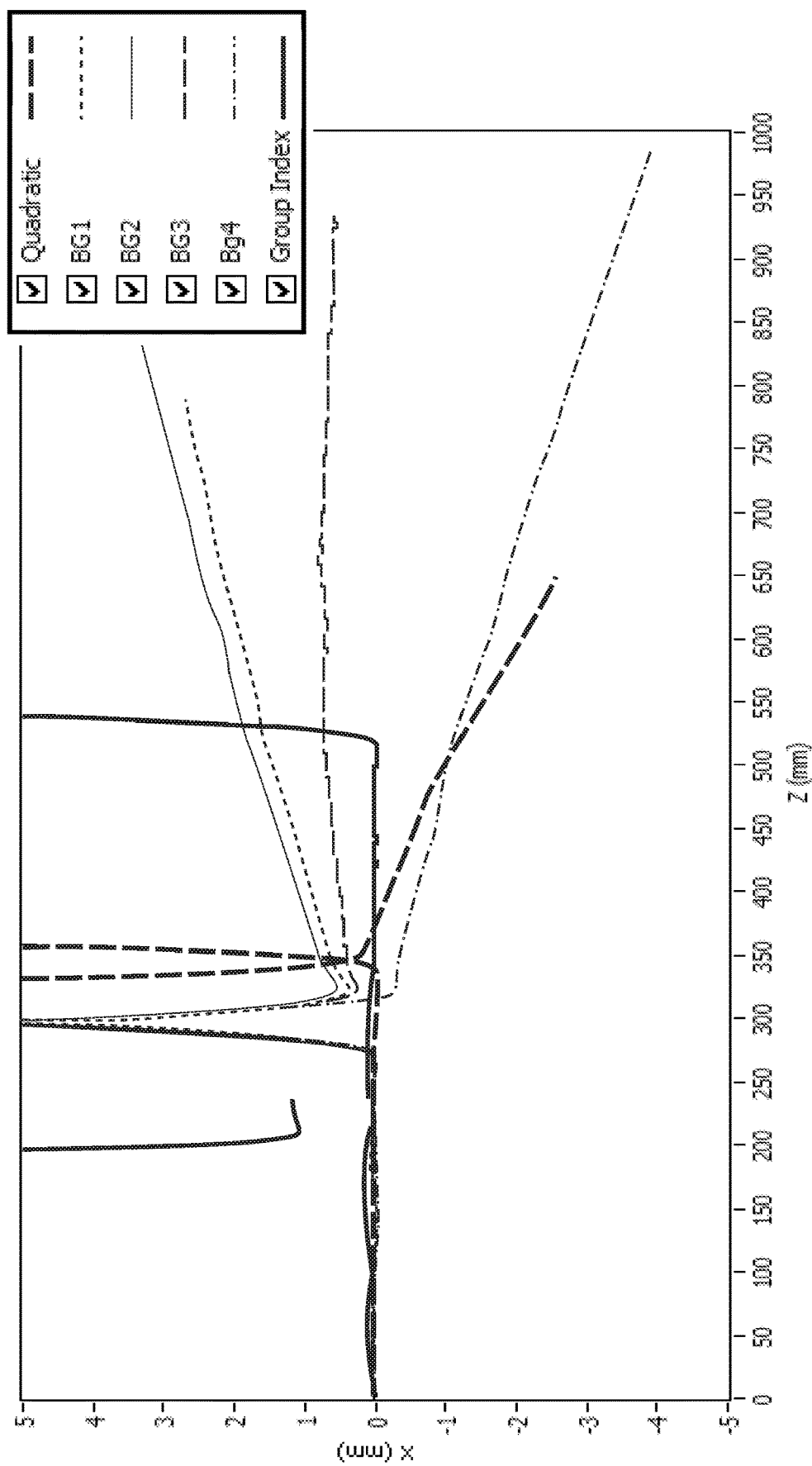
FIG. 27 is a zoomed-in view of the plots shown in FIG. 26.

To test the application of a distributed bend gain (BG) correction, an example test fiber was placed in loops of various sizes (see BG1-BG4 in FIG. 26). It was also placed in a "quadratic" shape (see Quadratic in FIG. 26), where the fiber is put into several loops in the same place, but comes in and out of these loops on the same straight line, and a "Group Index" shape (also shown in FIG. 26), where the fiber transverses a known rectangular path and goes in and out of that path on the same straight line. With a single, constant bend gain, the measured shapes did not all come out on a straight line as they should. The example plot in FIG. 26 shows these measured shapes with a fixed, constant bend gain applied. Zooming in around the x-axis, FIG. 27 shows that the shapes do not come out on a straight line except for BG 3 for which the bend gain appears to be correct.

Figure 28:
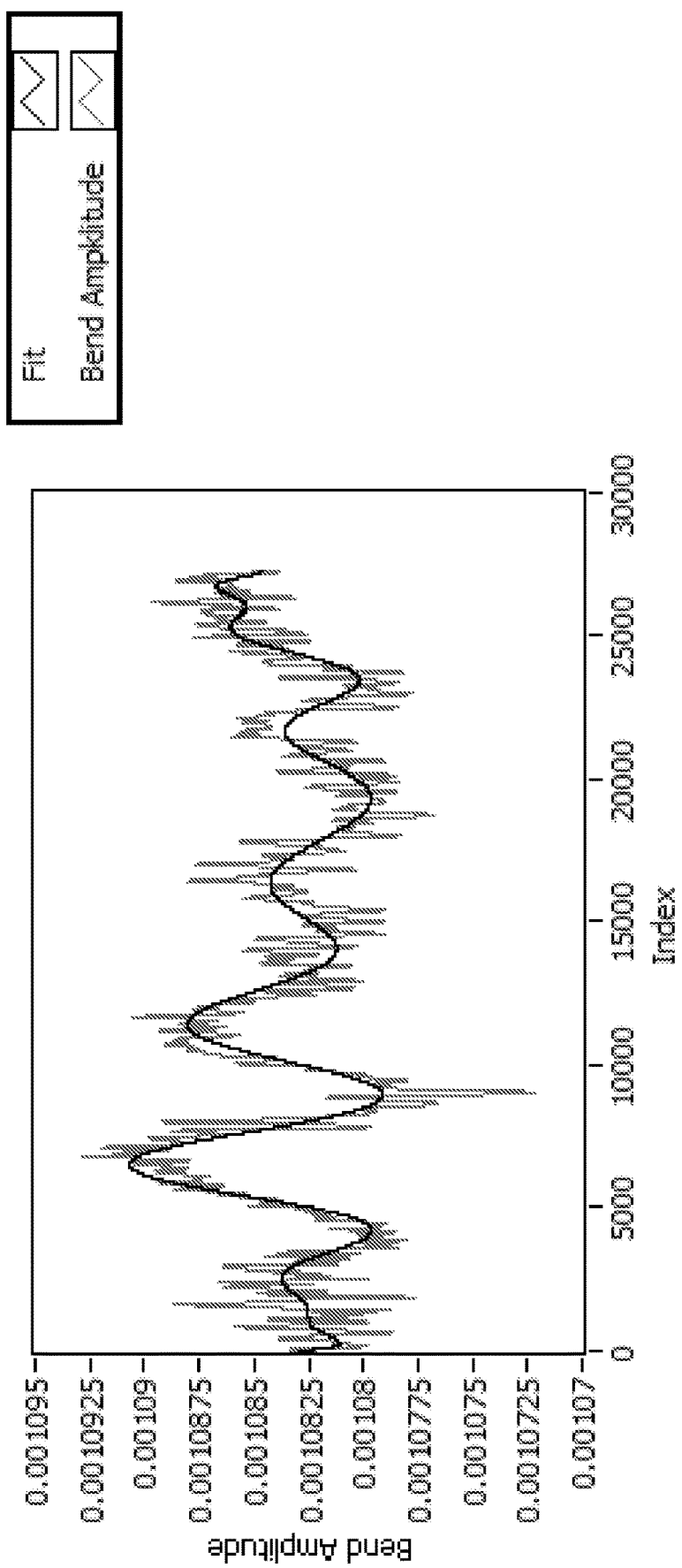
FIG. 28 plots a filtered distributed bend amplitude for an example fiber sensor wrapped on an example helical fixture (lighter line) and a polynomial fit of the data (darker line)

When this same test fiber sensor is wrapped around a helical calibration fixture with a constant diameter, the resulting bend amplitude varies along the length of the sensor. A plot of this measured bend amplitude as a function of index of delay along the fiber is shown with the lighter trace in FIG. 28. This data was filtered with a boxcar filter with a width of 1000 points. The data can be fit with a high order polynomial, as shown in the darker trace in FIG. 28. Alternatively, a different kind of curve fit can be used, such as a cubic spline fit.

Figure 29:
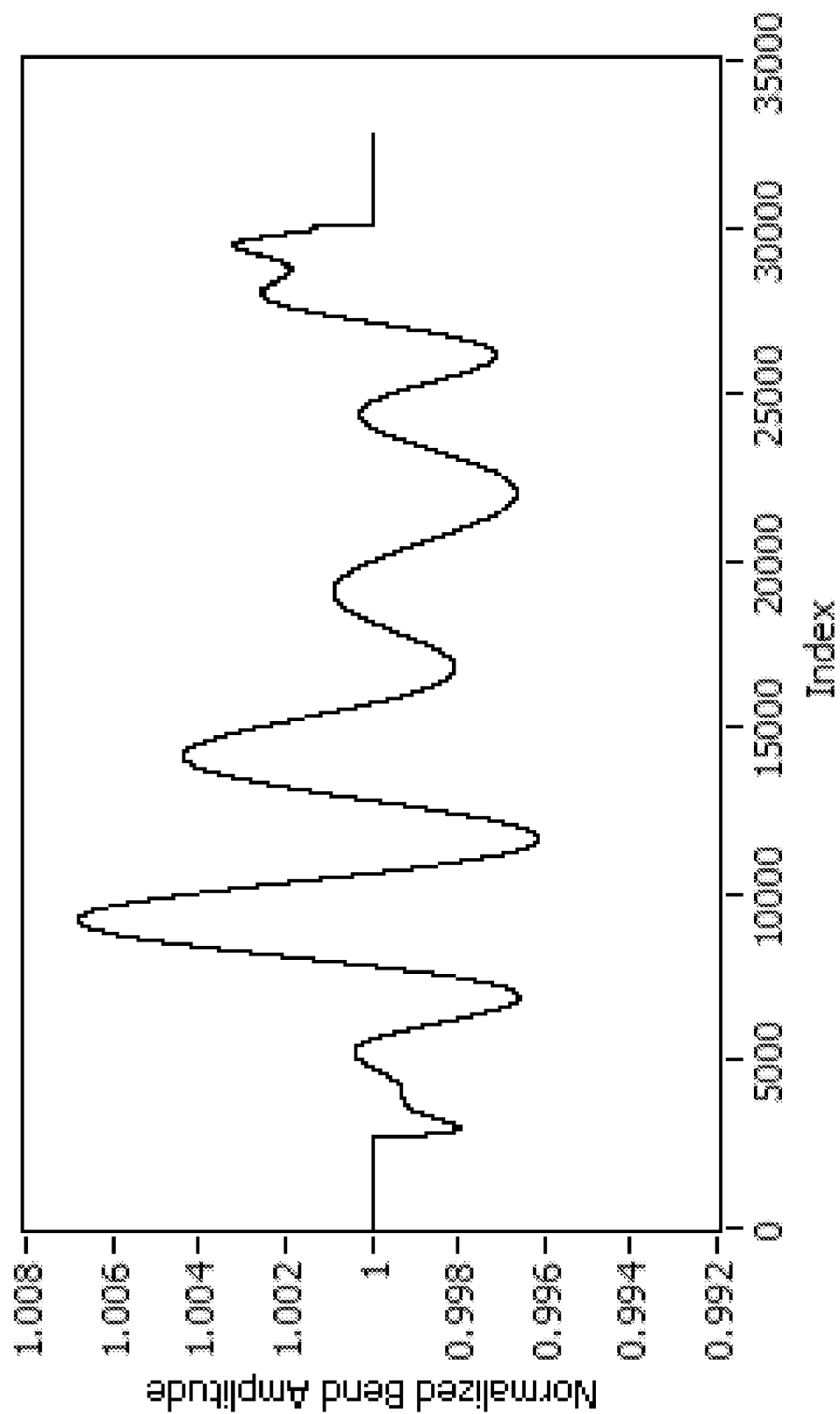
FIG. 29 shows a normalized, distributed bend amplitude with ends padded with ones where the fiber was not wrapped to match the full original data size.
Figure 30:
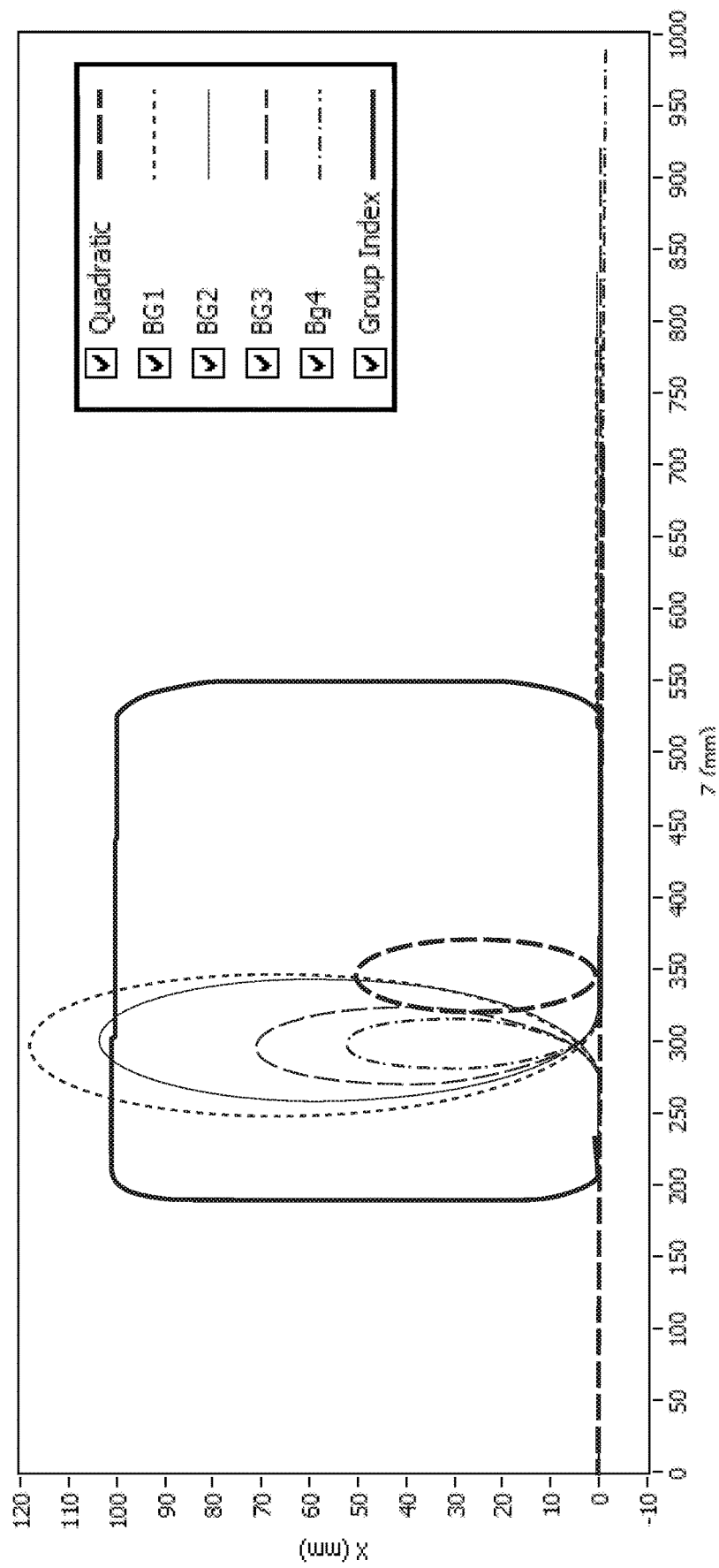
FIG. 30 is a plot of the same shapes shown in FIG. 26 but with a distributed bend gain correction applied.
Figure 31:
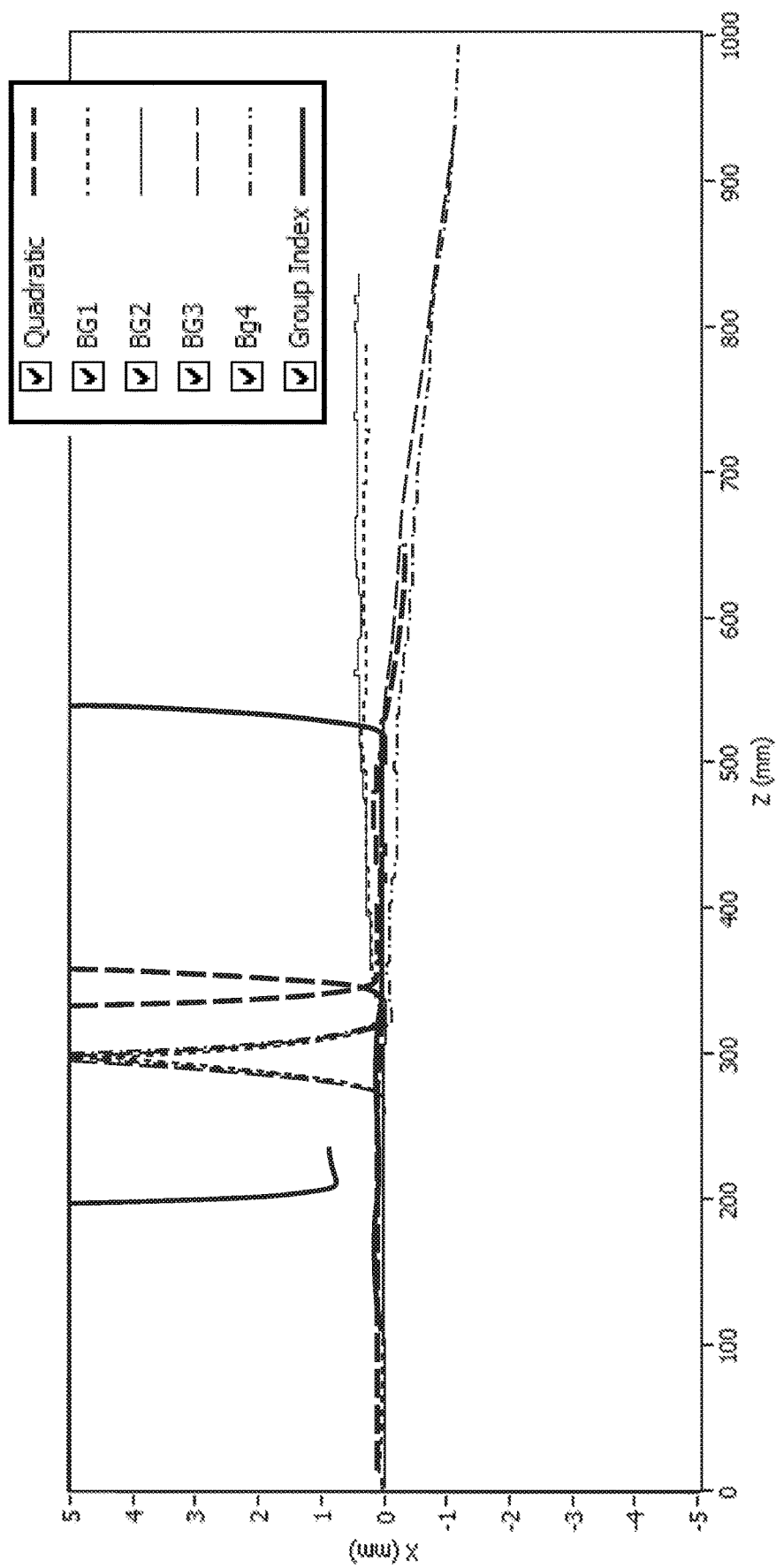
FIG. 31 is a zoomed-in view of the data in FIG. 30 showing that the shapes now exit nearly in a straight line.

Normalizing this polynomial and padding with 1's out to the original data size of 32768 to form a bend gain scale results in the graph shown in FIG. 29. This normalized bend amplitude function is used as a multiplier on the bend gain. Compared with FIGS. 26 and 27, when the normalized bend amplitude function is applied to the same measured shapes data, the newly calculated shapes now look much better, as shown in FIGS. 30 and 31. Here, the spread in resultant angles coming out of the shapes is much reduced, and they all come out nearly straight indicating that the distributed bend gain correction function properly corrects for variations in bend gain or core radius along the length of the fiber sensor.

In an example embodiment, a distributed bend gain scale is found by wrapping the fiber on a helical calibration fixture at two different, but low tensions, e.g., 100 and 300µε. This data is averaged, and a cubic spline fit is used to find a curve that fits the averaged data. The curve fit data is normalized and padded with 1's out to the original data size to form a bend gain scale. This scale is applied to form a distributed shape matrix, in which the bend gain, $\alpha$, varies as a function of distance along the sensor. This distributed shape matrix is described by Eq. 12 where the bend gain, $\alpha$, which was previously shown as a constant in Eq. 3, is now shown as a distributed value, $\alpha(z)$.

$$\begin{bmatrix} B_x(z) \\ B_y(z) \\ T(z) \\ E(z) \end{bmatrix} = \begin{bmatrix} \alpha(z)\gamma_1 r_1 \sin(\theta_1) & -\alpha(z)\gamma_1 r_1 \cos(\theta_1) & \beta\gamma_1 r_1^2 & \gamma_1 \\ \alpha(z)\gamma_2 r_2 \sin(\theta_2) & -\alpha(z)\gamma_2 r_2 \cos(\theta_2) & \beta\gamma_2 r_2^2 & \gamma_2 \\ \alpha(z)\gamma_3 r_3 \sin(\theta_3) & -\alpha(z)\gamma_3 r_3 \cos(\theta_3) & \beta\gamma_3 r_3^2 & \gamma_3 \\ \alpha(z)\gamma_4 r_4 \sin(\theta_4) & -\alpha(z)\gamma_4 r_4 \cos(\theta_4) & \beta\gamma_4 r_4^2 & \gamma_4 \end{bmatrix}^{-1} \begin{bmatrix} \varphi_1'(z) \\ \varphi_2'(z) \\ \varphi_3'(z) \\ \varphi_4'(z) \end{bmatrix} = \qquad (12)$$

$$\overline{S(z)}\begin{bmatrix} \varphi'_1(z) \\ \varphi'_2(z) \\ \varphi'_3(z) \\ \varphi'_4(z) \end{bmatrix}$$

Distributed Twist

Figure 32:
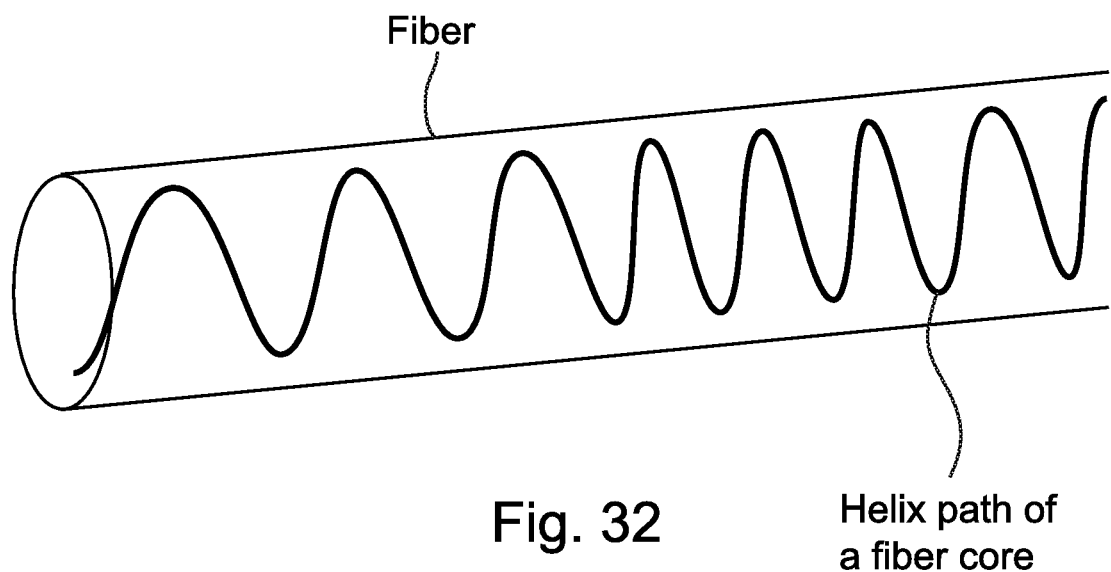
FIG. 32 is a diagram of variations in spin rate as a function of length.

In addition to a distributed bend gain correction due to the variation in radius along the length of the fiber, another correction is needed that accounts for the variation in spin rate of the fiber along its length. The spin rate of the fiber may be measured, and applied to shape calculations. In general, the rotation in bend angle with distance due to the fiber spin is linear; in other words, the fiber is spun at a constant rate. However, variations in the draw process cause local changes in the spin rate, as illustrated in FIG. 32. The variations in the spin rate are measured; the variations are referred to as "wobble." Knowing the spin rate variation is important for calculating accurate shape as described above.

Figure 33:
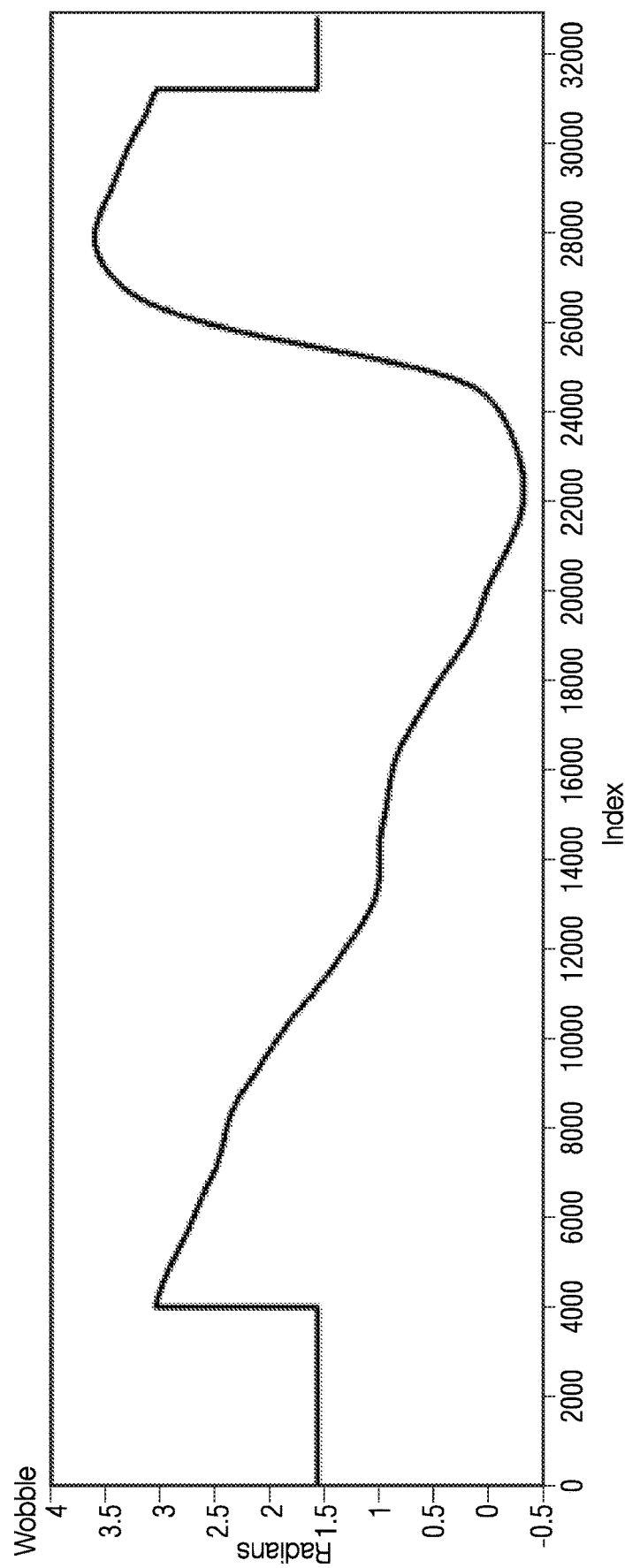
FIG. 33 is plot of the variation from linearity of the bend angle rotation (spin) as a function of distance along a fiber.

The twist gain is proportional to the spin rate as well as the radial location of the outer cores. In many cases, the changes in spin rate are small enough that not accounting for them in the distributed twist does not cause significant errors. However, in some cases, these variations are larger due to more variation in the fiber draw process. For example, one sensor showed nearly four radians of change from the constant linear bend angle rotation due to fiber spin as shown in FIG. 33.

A twist gain correction factor can be found by taking a derivative of the measured bend angle rotation normalizing that derivative, and dividing the twist by this factor. This calculation is outlined in the equations below. The spinning of the cores causes a variation in bend angle, $\theta_B$, as a function of length as expressed in Eq. 13. The rate of change of the bend angle rotation is found by taking a derivative with respect to z, as shown in Eq. 14. This derivative is normalized by dividing by the mean of the calculated derivative. The resulting value represents the percent variation in spin rate from the nominal, or mean, spin rate. This factor is applied to the twist signal to correct for the spin rate variation and its effect on the twist sensitivity and thus the twist scale factor.

$$\theta_B(z) = \tan^{-1}\left[\frac{B_y(z)}{B_x(z)}\right] \qquad (13)$$

$$\frac{d\theta_B(z)}{dz} = \text{rate of change of bend angle variation, or spin} \qquad (14)$$

This distributed twist is applied using the distributed shape matrix, described in Eq. 12, with a different matrix for every point along the sensor, but now with each point having a different twist gain, $\beta(z)$, as shown in Eq. 15.

Tension Effects

When the fiber is under tension, several things must be properly accounted for to achieve best results. As the calibration method using the helical calibration fixture calls for taking several data sets with varying levels of strain, the tension effects need to be properly handled when processing these data sets before using the results for calibration of the various coefficients.

First, as a part of calibration, the spin rate variation of the sensor is determined as a function of length along the sensor, or "wobble." The wobble is recorded for the fiber at a given tension, nominally the tension that the reference data set was taken at, which is typically near zero. When a sensor is under tension, that sensor is longer than it was in an un-tensioned state. In order to properly apply the wobble to a data set taken under tension, then, the data sets must be matched either by stretching the wobble to match the current data or by shrinking the current data to match the wobble data.

In an example embodiment, the measurement data is interpolated to match an original reference state where the fiber was typically under minimum tension. This can be accomplished by using the measured delay in the current measurement data with respect to the reference state to interpolate the measurement data to match the reference. One consequence of this interpolation is that the measured bend amplitude and bend angle are affected by the applied tension.

Assume, for example, that the sensor is wrapped on a helical calibration fixture of a given diameter under minimal tension. The bend amplitude as a function of length will be constant along the portion of the sensor that is wrapped. When that sensor is wrapped around the same helical calibration fixture, but under some level of tension, the sensor is elongated, but the bend amplitude as a function of length remains the same. Bend causes strain in the outer cores of the fiber proportional to the bend radius. Strain in each core is, in turn, proportional to the derivative of the measured phase difference for this fiber. The phase difference is measured as a function of optical delay. This phase difference is then interpolated such that each point along the sensor matches the location of that point in the un-tensioned reference data. A numerical derivative of this data set is determined with respect to index in the delay domain. However, the data set has been artificially shortened by this interpolation which effectively increases the increment each index represents in the delay domain. Thus, the phase derivative is artificially inflated. In effect, the bend amplitude measured from this interpolated data will be incorrectly too high due to these numerical effects. This same effect causes the measured helical pitch to be artificially inflated; in effect, the helical shape appears to be rising faster than it actually is, resulting in a measured bend angle that is too large. These effects are accounted for with a tension dependent correction to the bend amplitude and also to the bend angle slope when comparing it with the expected bend angle slope for a given helix.

$$\begin{bmatrix} B_x(z) \\ B_y(z) \\ T(z) \\ E(z) \end{bmatrix} = \begin{bmatrix} \alpha(z)\gamma_1 r_1 \sin(\theta_1) & -\alpha(z)\gamma_1 r_1 \cos(\theta_1) & \beta(z)\gamma_1 r_1^2 & \gamma_1 \\ \alpha(z)\gamma_2 r_2 \sin(\theta_2) & -\alpha(z)\gamma_2 r_2 \cos(\theta_2) & \beta(z)\gamma_2 r_2^2 & \gamma_2 \\ \alpha(z)\gamma_3 r_3 \sin(\theta_3) & -\alpha(z)\gamma_3 r_3 \cos(\theta_3) & \beta(z)\gamma_3 r_3^2 & \gamma_3 \\ \alpha(z)\gamma_4 r_4 \sin(\theta_4) & -\alpha(z)\gamma_4 r_4 \cos(\theta_4) & \beta(z)\gamma_4 r_4^2 & \gamma_4 \end{bmatrix}^{-1} \begin{bmatrix} \varphi'_1(z) \\ \varphi'_2(z) \\ \varphi'_3(z) \\ \varphi'_4(z) \end{bmatrix} = \overline{S(z)} \begin{bmatrix} \varphi'_1(z) \\ \varphi'_2(z) \\ \varphi'_3(z) \\ \varphi'_4(z) \end{bmatrix} \qquad (15)$$

The correction factor may be found by looking at the effective change in the segment length. The segment length along the sensor is changed by a strain dependent factor.

$$L' = L(1+\varepsilon) = \frac{c\tau(1+\varepsilon)}{2n'} \quad (16)$$

Here, L' is the segment length under tension, L is the original segment length, $\varepsilon$ is the applied strain, c is the speed of light in vacuum, $\tau$ is the optical delay per segment, and n' is the group index under tension.

The effect of tension on the group index is described via the following equation:

$$n' = n(1-\rho_e\varepsilon) \quad (17)$$

Here, n is the un-tensioned group index of the fiber and $\rho_e$ is the strain-optic coefficient. Inserting n' into Eq. (16) produces:

$$L' = \frac{c\tau(1+\varepsilon)}{2n(1-\rho_e\varepsilon)} = L\frac{1+\varepsilon}{1-\rho_e\varepsilon} \quad (18)$$

or $$L = L'\frac{1-\rho_e\varepsilon}{1+\varepsilon} \quad (19)$$

This correction factor, $$\frac{1-\rho_e\varepsilon}{1+\varepsilon},$$

is applied to the calculated bend B(z) as a function of distance z to produce a corrected bend B(z).

$$B'(z) = B(z)\frac{1-\rho_a\varepsilon(z)}{1+\varepsilon(z)} \quad (20)$$

In addition, the predicted physical bend angle slope for a given helix must be modified when using to compare with or correct measured bend angle slopes. For example, when calculating the wobble, the rise in bend angle with respect to index due to the physical helix must be subtracted from the measured bend angle in order to calculate the correct internal spin rate of the fiber. The predicted bend angle change due to the physical helix is multiplied by a correction factor of $$\frac{1+\varepsilon}{1-\rho_a\varepsilon}$$

before subtracting it from the measured bend angle change to correctly calculate the spin rate as a function of location along the sensor.

The twist is corrected for the applied tension using the following equation:

$$T'(z) = T(z)(1+\varepsilon(z))^2 \quad (21)$$

Relative Group Index Adjustment

Figure 34:
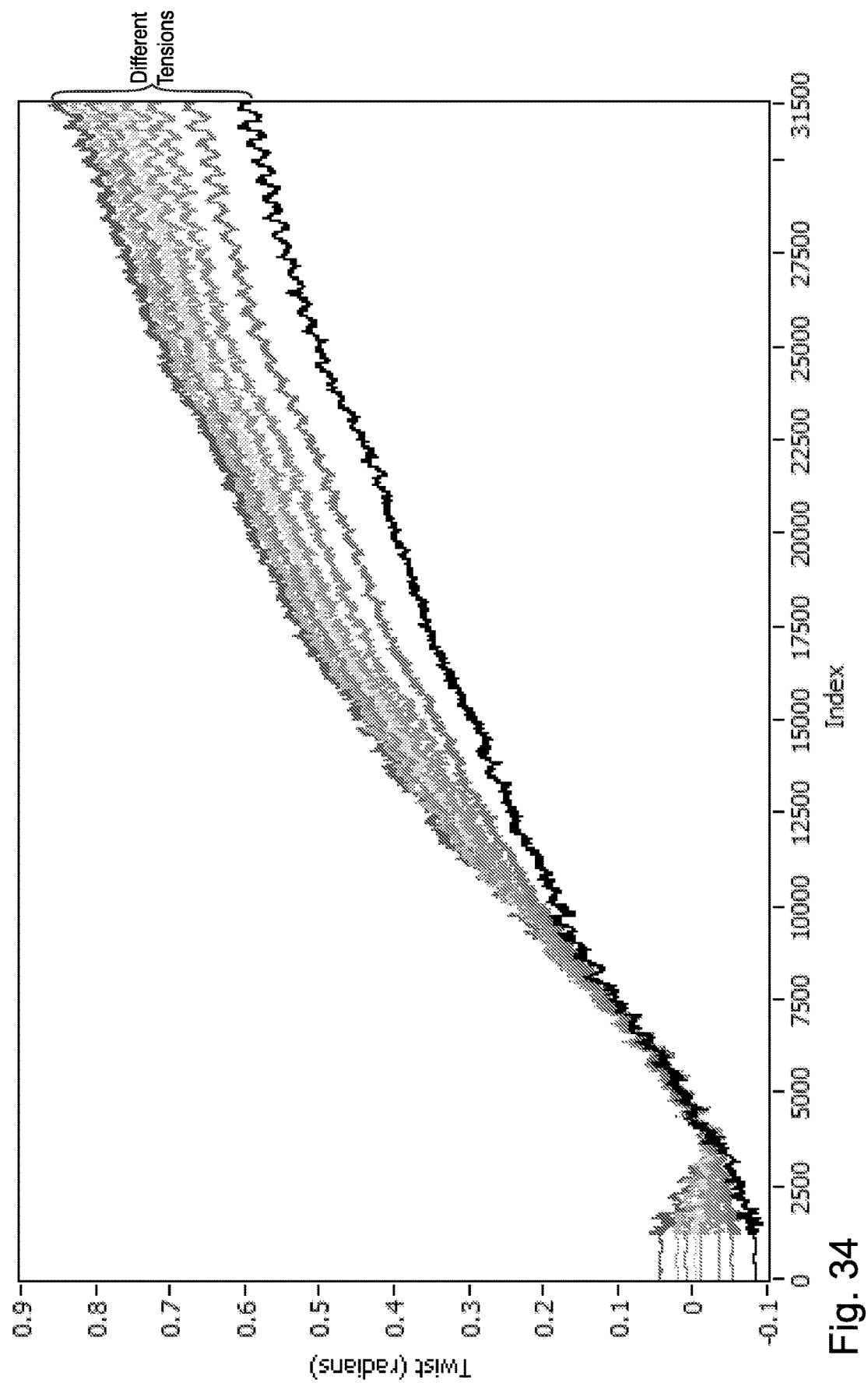
FIG. 34 graphs the measured twist for several wraps on an example helical fixture with a small diameter (20 mm) at various tensions. The variation in the amplitude of ripple in these signals indicate the relative group indexes are not correct.

As described above, it is important to know the relative group index of each core in order to physically align the data from each core. If the relative group index is wrong for a core or a set of cores, it results in a ripple at the spin frequency in the twist data when the fiber is tightly bent. FIG. 34 graphs the measured twist for several wraps on an example helical calibration fixture with a small diameter (20 mm) at various tensions (eight different tensions are shown). The variation in the amplitude of ripple in these signals along the length of the sensor as shown in FIG. 34 indicates the relative group indexes are not correct. It will have a low amplitude where the cores are aligned and a high amplitude where they are not aligned. An additional redundant core check also shows a similar ripple when the relative group index is wrong. This redundant core signal is described in U.S. provisional patent application Ser. No. 62/334,649, filed May 11, 2016, the contents of which are incorporated herein by reference. A redundant core signal can be calculated that predicts the phase of any core measured that is not in the group of cores used to calculate the shape and checks the predicted phase against the measured phase. Ideally, the redundant check is zero, i.e., the predicted phase matches the measured phase exactly, and the difference is zero. For example, for the seven core fiber shown in FIG. 1C, if four cores are used to calculate the shape, and six core phases are measured, a redundant core check can be calculated for the two other cores. Ripple in the twist and each of the redundant core signals can be used to find a correction to the relative group index for each core.

The fiber is wound on a helical calibration fixture with a relatively small diameter, for example 20 mm. The ripple amplitude in the twist and redundant core signals is then measured in a location at the proximal end of the sensor and at a location at the distal end of the sensor. This ripple can either be caused by incorrect core angle locations, incorrect relative group indexes or incorrect core alignment shifts. Incorrect geometry and incorrect core alignment shifts cause a ripple which has a constant amplitude as a function of length. Variation in the ripple amplitude is due to incorrect relative group indexes (see FIG. 34).

For a given location, corrections to core angle locations can be found which minimize the ripple at that location. If it is assumed that the geometry is actually correct, then these geometry changes actually imply a need for relative core shifts. The shifts in angle can be equated to core shifts using Eq. (22)

$$\Delta z_i = \frac{\Delta\theta_i}{2\pi}S \quad (22)$$

where $\Delta z_i$ is the core shift correction for a given core, $\Delta\theta_i$ is the calculated angular correction for that core, and S is the spin rate of the fiber. Because the angles are defined with respect to a reference core, corrections to this core's relative group index cannot be found. In addition, shifts in the center core or geometry errors in its location have minimal effect on the ripple amplitude as this core is near the center of the fiber and minimally helixed, so corrections to its group index also cannot be found with this method.

An optimization method is used to find core angle corrections at two locations, one proximal and one distal along the fiber, that minimize the ripple amplitude at each location. These core angle changes are used to predict core shifts needed to minimize the ripple. Comparing the shifts at the beginning and the end of the sensor yields an adjustment to the relative group index for all but the reference core and the center core. This relative group index adjustment is applied to the relative index initially found and stored in the calibration file. In addition, the data used for calibration is interpolated with this adjustment to achieve optimal core alignment for calibration data processing.

Core Alignment

Figure 35:
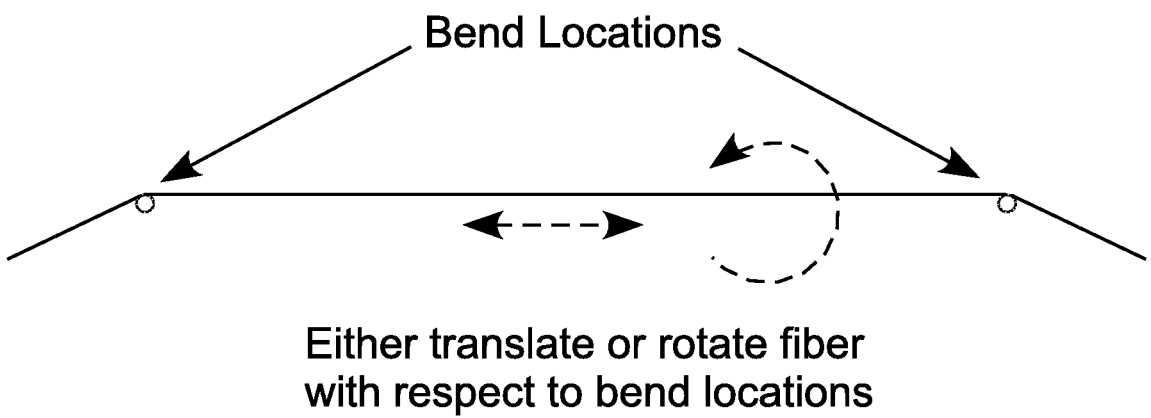
FIG. 35 is a diagram showing sharp bends applied at two locations along a fiber.
Figure 36:
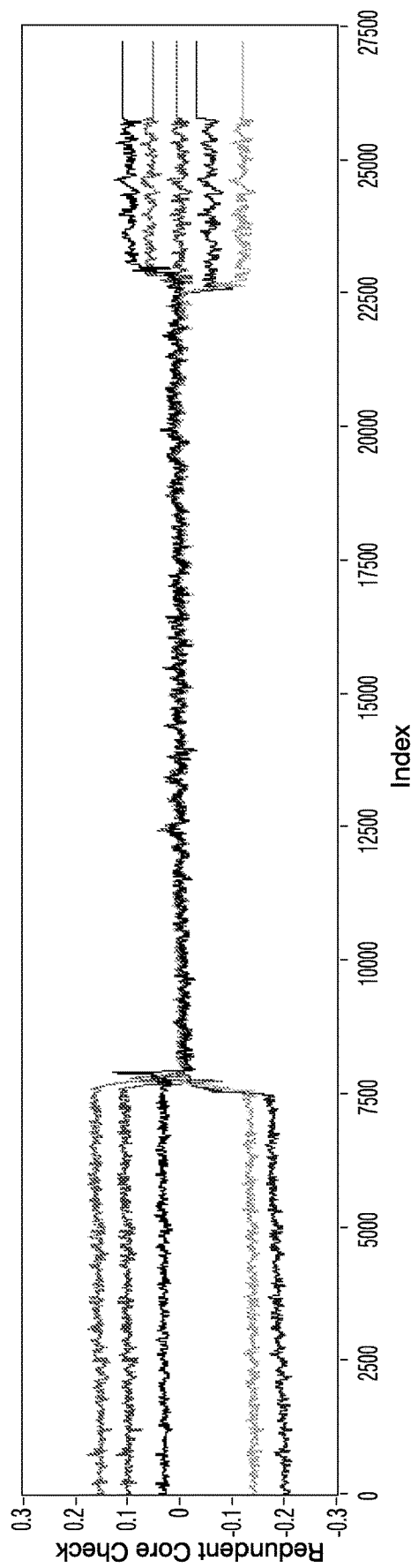
FIG. 36 plots a redundant core signal for the fiber translated along an example fixture applying sharp bends at two locations.

An initial core alignment is found by aligning the reference scan to the cleaved end scan taken with a staggered fanout, as described above. Errors in this alignment can be caused by such things as a weak connector peak that yields a poor peak location and alignment with other cores. Errors in core alignment will be seen in constant ripple amplitude as a function of sensor length in the twist and redundant core signal at the spin frequency. However, for very small, fractional index errors in core alignment, this ripple is not a sensitive enough measure of misalignment. If, instead, a sharp bend is applied to the fiber at one or more locations (see FIG. 35), this will create a jump in the twist and the redundant core signals at those locations if the cores are misaligned (see FIG. 36). Depending on which fiber core is out of alignment, the bend might not be in the right plane to cause this jump or step in the redundant core signal. In order to get a good measure of core alignment for each core, then, the bend location can be slightly shifted along the fiber, or the fiber can be shifted with respect to the object applying the bend. Alternatively, the sensor can be rotated with respect to the bend such that the bend is in a different plane with respect to the fiber cores. If several measurements are taken with the bend at a range of locations or rotations that spans one or two periods of the internal fiber helix, a measure of the alignment of each core can be made.

An optimization method is used to find core angle corrections for which the steps in the redundant core signal data are minimized for all bend locations. This geometry correction is then converted to core shifts for each of the outer cores except the reference core using Eq. (22). If bends are applied at more than one location along the fiber, for example a proximal and a distal location, core shifts are found to minimize the steps in the redundant core data at each location. These core shifts are averaged to generate a more accurate core shift correction.

Figure 37:
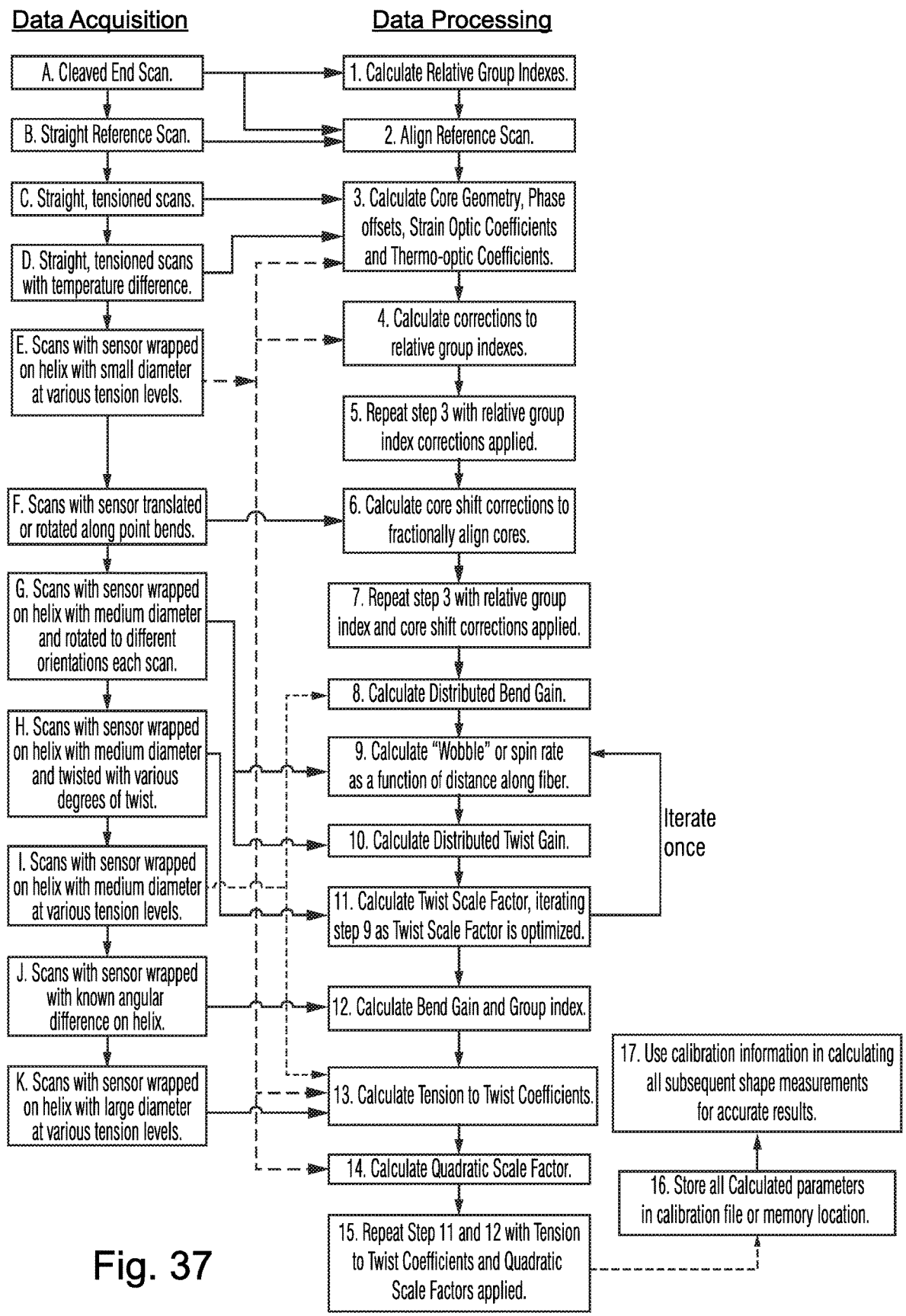
FIG. 37 is a flow chart showing example calibration processes.

FIG. 37 shows a flow chart of a non-limiting example embodiment of an overall acquisition process for acquiring calibration parameters for a fiber sensor using the technologies described above. On the left side are OFDR acquisition scans A-K of the fiber sensor under various conditions. On the right side, the data processing steps are enumerated 1-17. Arrows show which OFDR acquisition scans A-K of the fiber sensor are used for each data processing step 1-17. It is possible to calculate several of the calibration parameters with a different scan type or combination of scans. For example, the "wobble" or spin rate variation can be calculated from any data set in which the fiber is wound on a helix. Indeed it can be advantageous to use the average result from several different kinds of wraps on helixes. Although a specified order of steps is shown in FIG. 37, that order is preferred but not essential. Similarly, different example embodiments use fewer than all of the OFDR acquisition scans A-K of the fiber sensor and corresponding data processing steps 1-15.

The specific steps in FIG. 37 are now described. OFDR fiber sensor data is measured with the fiber sensor's end cleaved (step A) and used to calculate relative group indexes for each core (step 1). A reference OFDR measurement scan is taken with the fiber sensor straight (step B). The cleaved end OFDR measurement scan data is used to align this reference OFDR measurement scan data so that the measurement of strain at each location in the stored (in memory) array of strains for each core in the fiber sensor corresponds to the same physical location in the fiber sensor (step 2).

OFDR measurement scan data is then taken with the fiber sensor pulled straight at several levels of increasing tension (step C). OFDR measurement scan data is also taken at these same levels of tension with a cold metal block placed close to the fiber sensor to induce a temperature change along the sensor (step D). The fiber sensor is then wrapped on a helix with a small diameter (e.g., 20 mm) at various levels of increasing tension, and OFDR measurement scan data is taken at each tension level (step E). The OFDR measurement scan data from step E is used to calculate the core geometry. In turn, the core geometry is used in conjunction with the data from step C to calculate phase offsets and strain optic coefficients for each core. OFDR measurement scan data from step D is used to determine thermo-optic coefficients for each core.

The OFDR measurement scan data from step E is used to determine fractional corrections to the relative group indexes originally found in step 1. These fractional corrections are applied to the OFDR measurement scan data from steps C, D, and E, and step 3 is repeated to find updated core geometry, phase offsets, strain-optic coefficients, and thermo-optic coefficients (step 5).

OFDR measurement scan data is then taken with point bends applied at two locations on the fiber sensor. Several OFDR measurement scan data sets are taken as the fiber is translated along these point bends (step F). This OFDR measurement scan data is used to find fractional corrections to the core alignment shifts applied in step 2 (step 6). These fractional core shifts are applied to the data from C, D, and E, and step 3 is repeated to find updated core geometry, phase offsets, strain-optic coefficients, and thermo-optic coefficients (step 7).

Because of ease in order of operations in using the helical calibration fixture, two OFDR measurement scan data sets are now taken for use in steps 9, 10, and 11. First, OFDR measurement scan data is taken with the fiber sensor wrapped on a helix with a medium diameter (for example 60 mm), with the fiber sensor rotated at different orientations for each scan (step G). The rotation is accomplished by rotating motors 42 and 46 in FIG. 12 before wrapping the sensor on the helix. The fiber sensor is then wrapped on the same helix, but with varying levels of twist applied by rotating either motor 42 or 46 and holding the other actuator fixed before wrapping the sensor on the helix. OFDR measurement scan data is taken with varying levels of twist (for example, every 90° from +360° to)−360° (step H).

Then OFDR measurement scan data is taken with the fiber sensor wrapped on the same medium helix with the fiber sensor held at various levels of tension (step I). The two lowest tension scans are used to calculate the distributed bend gain (step 8). The OFDR measurement scan data from step G is used to calculate the "wobble" or variation in spin rate along the fiber sensor, as well as the distributed twist gain.

OFDR measurement scan data from step H is used to calculate a twist scale factor. This twist scale factor is applied and used to calculate an updated wobble and distributed twist (repeat steps 9 and 10).

OFDR measurement scan data is then taken with the fiber sensor wrapped with a known angular difference (for example 1080 degrees) on the medium helix (step J). This OFDR measurement scan data is used to calculate the bend gain and also the group index.

The last acquired OFDR measurement scan data set is with the fiber sensor wrapped on a helix with a large diameter (for example 110 mm) at various tension levels (step K). This OFDR measurement scan data is used in conjunction with the data from steps E and I to find the tension to twist coefficients. Then the OFDR measurement scan data from step E is used to find a quadratic scale factor. Steps 11 and 12 are repeated with the tension to twist coefficients and quadratic scale factor applied.

All of the above calibration parameters are stored in a calibration file or memory location for future use (step 16). This calibration information is used for subsequent shape measurements using this fiber sensor in order to accurately calculate shape (step 17).

Figure 38:
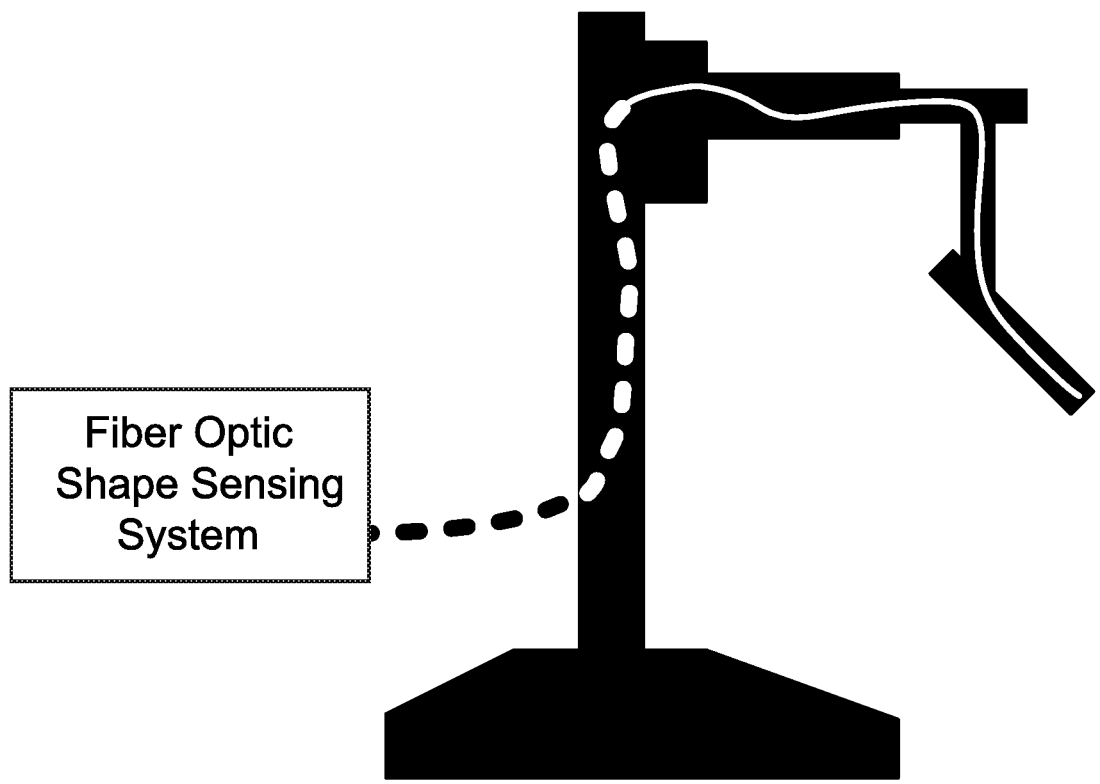
FIG. 38 shows a non-limiting example application for shape sensing fiber in a robotic arm used in surgical or other environments that benefits from the accurate and reliable calibration features described in this application.

The technology described above has wide and diverse applications. One non-limiting example application for shape sensing fiber that requires a high degree of confidence in terms of the accuracy and reliability of the shape sensing output is robotic arms used in surgical or other environments. See FIG. 38. The accurate and reliable calibration features described above are particularly helpful in this and other shape sensing applications.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology described, for it to be encompassed by the present claims. No claim is intended to invoke paragraph 6 of 35 USC § 112 unless the words "means for" or "step for" are used. Furthermore, no embodiment, feature, component, or step in this specification is intended to be dedicated to the public regardless of whether the embodiment, feature, component, or step is recited in the claims.

The invention claimed is:

1. An interferometric measurement system for measuring a spun optical fiber sensor including multiple optical cores, comprising:
    a calibration machine including a calibration fixture having known dimensions, one or more controllable actuators for wrapping the fiber sensor starting at one end of the fiber sensor onto the calibration fixture having known dimensions, and an actuator controller configured to control the one or more actuators with actuator control signals;
    interferometric detection circuitry coupled to the actuator controller and configured to be coupled to the other end of the fiber sensor, the interferometric detection circuitry configured to detect measured interferometric pattern data associated with each of the multiple cores when the fiber sensor is wrapped onto the calibration fixture;
    data processing circuitry configured to determine compensation parameters that compensate for variations between an optimal configuration of the multiple cores and an actual configuration of the multiple cores in the fiber sensor based on the detected measured interferometric pattern data; and
    a memory configured to store the compensation parameters.

2. The interferometric measurement system in claim 1, wherein the calibration fixture includes multiple disks each having a different diameter.

3. The interferometric measurement system in claim 1, wherein the actuator controller is configured to control the one or more actuators to wrap the fiber sensor with different twists, rotations, or tensions onto the calibration fixture, and wherein the data processing circuitry is configured to determine the compensation parameters based on measurement interferometric pattern data detected with the different twists, rotations, or tensions in the wrapping of the fiber sensor onto the calibration fixture.

4. The interferometric measurement system in claim 1, wherein:
    the actuator controller is configured to control the one or more actuators to wrap the fiber sensor onto the calibration fixture at multiple tensions or rotations;
    the interferometric detection circuitry is configured to detect measured interferometric pattern data associated with each of the multiple cores when the fiber sensor wrapped onto the calibration fixture is moved to each of the multiple tensions or rotations; and
    the data processing circuitry is configured to determine compensation parameters that compensate for variations between an optimal configuration of the multiple cores and an actual configuration of the multiple cores in the fiber sensor based on the detected measured interferometric pattern data when the fiber sensor wrapped onto the calibration fixture is moved to each of the multiple tensions or rotations.

5. The interferometric measurement system in claim 1, wherein one of the multiple cores in the fiber sensor is identified as a reference core, and wherein the data processing circuitry is configured to:
    determine a complex spin signal for each of the multiple cores in the fiber sensor;
    compare each complex spin signal to a reference complex spin signal; and
    determine individual core radial and angular positions relative to the reference core.

6. The interferometric measurement system in claim 1, wherein:
    each of the multiple cores has a cleaved end and a connector end,
    the interferometric detection circuitry includes a staggered delay between detection interferometers associated with the multiple cores,
    the interferometric detection circuitry is configured to detect measured interferometric pattern data associated with a cleaved end reflection of each core of the multiple cores and measured interferometric pattern data associated with a connector end reflection of each core of the multiple cores, and
    the data processing circuitry is configured to determine relative delays between the cleaved end and connector end reflections for each core of the multiple cores, and from the relative delays, determine relative group index parameters for cores of the multiple cores with respect to a reference core that compensate for variations in optical delay between the multiple cores.

7. The interferometric measurement system in claim 1, wherein:
    the interferometric detection circuitry is configured to detect measured interferometric pattern data associated with a connector reflection of each core of the multiple cores on a corresponding interferometric channel using staggered delays associated with the interferometric channels, and the data processing circuitry is configured to determine alignment correction parameters using the detected measured interferometric pattern data associated with the connector reflection of each core of the multiple cores to align the interferometric pattern data for each core of the multiple cores with other cores of the multiple cores.

8. The interferometric measurement system in claim 1, wherein the data processing circuitry is configured to:
measure interferometric pattern data of the fiber sensor pulled straight at various tension levels, and
determine, from the measured interferometric pattern data;
a strain optic coefficient for each of the multiple cores based on bend, strain, and twist measurements of the fiber sensor for multiple different combinations of cores, wherein respective strain optic coefficients for each of the cores equalize bend, strain, and twist measurements made for each of the multiple cores, or
a phase offset for each core of the multiple cores for eliminating phase due to bending, or
a thermo-optic coefficient for each core of the multiple cores.

9. The interferometric measurement system in claim 1, wherein the data processing circuitry is configured to:
measure interferometric pattern data when the fiber sensor is first wrapped a smaller amount on the calibration fixture and then wrapped a larger amount on the calibration fixture;
calculate a bend difference between the measured data for the smaller amount and for the larger amount; and
determine a proportionality coefficient from the calculated bend difference.

10. The interferometric measurement system in claim 1, wherein the data processing circuitry is configured to:
determine a complex spin signal for each of the cores when the fiber sensor is wrapped on the calibration fixture;
calculate a bend angle variation from the complex spin signals; and
determine a spin rate variation along a length of the fiber sensor based on the bend angle variation.

11. The interferometric measurement system in claim 1, wherein the data processing circuitry is configured to:
measure interferometric pattern data when the fiber sensor is wrapped on the calibration fixture at multiple levels of twist, and
determine a proportionality coefficient from the measured data such that all of the measured data at the multiple levels of twist produce a same measured shape of the fiber sensor.

12. The interferometric measurement system in claim 1, wherein the data processing circuitry is configured to:
measure the interferometric pattern data when the fiber sensor is wrapped on helixes with differing diameters at differing tensions, and
determine coefficients that relate tension to twist at various bend radii such that a calculated shape of the fiber sensor is correct at different levels of tension and with various bend radii applied to the fiber sensor.

13. The interferometric measurement system in claim 1, wherein the data processing circuitry is configured to:
measure interferometric pattern data when the fiber sensor is wrapped on the calibration fixture with a constant bend radius, and
determine from the measured data a proportionality coefficient such that a calculated bend radius is constant along a length of the fiber sensor.

14. The interferometric measurement system in claim 1, wherein the data processing circuitry is configured to:
determine a complex spin signal for each of the cores when the fiber sensor is wrapped on the calibration fixture;
determine a spin rate variation along a length of the sensor; and
determine a proportionality coefficient from the spin rate variation.

15. The interferometric measurement system in claim 1, wherein the data processing circuitry is configured to determine shift amounts based on point bend data, wherein the shift amounts line up the measured interferometric pattern data for each core such that the measured interferometric pattern data starts from a same physical location in each core.

16. The interferometric measurement system in claim 1, wherein the calibration fixture is helically-shaped.

17. A method of operating an interferometric measurement system for measuring a spun optical fiber sensor including multiple optical cores, the method comprising:
detecting, with interferometric detection circuitry, measured interferometric pattern data associated with each of the multiple cores when the fiber sensor is wrapped onto a helical calibration fixture having known dimensions;
determining, with data processing circuitry, compensation parameters that compensate for variations between an optimal configuration of the multiple cores and an actual configuration of the multiple cores in the fiber sensor based on the detected measured interferometric pattern data; and
storing the compensation parameters in a memory.

18. The method of claim 17, further comprising:
controlling, with an actuator controller, one or more actuators to wrap the fiber sensor with different twists, rotations, or tensions onto the helical calibration fixture.

19. The method of claim 17, wherein
detecting, with interferometric detection circuitry, the measured interferometric pattern data associated with each of the multiple cores comprises:
detecting the measured interferometric pattern data associated with a connector reflection of each core of the multiple cores on a corresponding interferometric channel using staggered delays associated with the interferometric channels; and wherein determining, with data processing circuitry, the compensation parameters comprises:
determining alignment correction parameters using the detected measured interferometric pattern data associated with the connector reflection of each core of the multiple cores to align the interferometric pattern data for each core of the multiple cores with other cores of the multiple cores.

20. The method of claim 17, wherein determining, with data processing circuitry, the compensation parameters comprises:
calculating a bend difference between first interferometric pattern data measured when the fiber sensor is wrapped a smaller amount on a helical fixture and second interferometric pattern data measured when the fiber sensor is wrapped a larger amount on the helical fixture;

determining a proportionality coefficient from the calculated bend difference.

* * * * *

UNITED STATES PATENT AND TRADEMARK OFFICE
CERTIFICATE OF CORRECTION

PATENT NO. : 10,775,157 B2
APPLICATION NO. : 16/307269
DATED : September 15, 2020
INVENTOR(S) : Gifford et al.

Page 1 of 1

It is certified that error appears in the above-identified patent and that said Letters Patent is hereby corrected as shown below:

In the Claims

In Column 27, Line 55, in Claim 1, delete "circuitry" and insert --circuitry,-- therefor In Column 30, Line 53, in Claim 19, after "and", insert --¶--

Signed and Sealed this
Ninth Day of February, 2021

Drew Hirshfeld
*Performing the Functions and Duties of the
Under Secretary of Commerce for Intellectual Property and
Director of the United States Patent and Trademark Office*